(12) United States Patent
Fujiwara

(10) Patent No.: US 10,451,042 B2
(45) Date of Patent: Oct. 22, 2019

(54) JOINT STRUCTURE AND WIND POWER GENERATION DEVICE

(71) Applicant: JTEKT CORPORATION, Osaka-shi, Osaka (JP)

(72) Inventor: Hideki Fujiwara, Kitakatsuragi-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 117 days.

(21) Appl. No.: 15/592,971

(22) Filed: May 11, 2017

(65) Prior Publication Data

US 2017/0248175 A1   Aug. 31, 2017

Related U.S. Application Data

(62) Division of application No. 14/913,481, filed as application No. PCT/JP2014/072571 on Aug. 28, 2014, now Pat. No. 9,995,280.

(30) Foreign Application Priority Data

Aug. 29, 2013 (JP) ................. 2013-178228
Oct. 24, 2013 (JP) ................. 2013-220888

(51) Int. Cl.
*F03D 13/10*   (2016.01)
*F03D 9/20*   (2016.01)
(Continued)

(52) U.S. Cl.
CPC ............... *F03D 13/10* (2016.05); *F03D 9/20* (2016.05); *F03D 9/25* (2016.05); *F03D 15/00* (2016.05);
(Continued)

(58) Field of Classification Search
None
See application file for complete search history.

(56) References Cited

U.S. PATENT DOCUMENTS 6,227,803 B1   5/2001   Shim
6,856,042 B1   2/2005   Kubota
(Continued)

FOREIGN PATENT DOCUMENTS

EP   2568197 A1   3/2013
EP   2985457 A1   2/2016
(Continued)

OTHER PUBLICATIONS

Aug. 17, 2017 Office Action Issued in U.S. Appl. No. 14/913,481.
(Continued)

*Primary Examiner* — Mark A Manley
(74) *Attorney, Agent, or Firm* — Oliff PLC

(57) ABSTRACT

A joint structure includes a clutch unit interposed between a shaft joint and a shaft body which is one of an output shaft of a speed increaser and an input shaft of a power generator. The clutch unit includes: a shaft coupling portion rotating integrally with the shaft body; a joint coupling portion rotating integrally with the shaft joint; and a one-way clutch provided between the shaft coupling portion and the joint coupling portion. The one-way clutch makes a connection integrally rotatably between the shaft coupling portion and the joint coupling portion in a state in which a rotation speed of the output shaft is higher than that of the input shaft, and releases the connection between the shaft coupling portion and the joint coupling portion in a state in which the rotation speed of the output shaft is lower than that of the input shaft.

6 Claims, 20 Drawing Sheets

(51) Int. Cl.

| | |
|---|---|
| *F03D 9/25* | (2016.01) |
| *F03D 80/70* | (2016.01) |
| *F03D 15/10* | (2016.01) |
| *F16H 1/28* | (2006.01) |
| *F16D 41/064* | (2006.01) |
| *F03D 80/00* | (2016.01) |
| *F03D 15/00* | (2016.01) |
| *F16D 41/08* | (2006.01) |
| *F16D 41/067* | (2006.01) |
| *F16D 41/07* | (2006.01) |

(52) U.S. Cl.
CPC .......... *F03D 15/10* (2016.05); *F03D 80/00* (2016.05); *F03D 80/70* (2016.05); *F16D 41/064* (2013.01); *F16D 41/067* (2013.01); *F16D 41/073* (2013.01); *F16D 41/08* (2013.01); *F16H 1/28* (2013.01); *F05B 2240/221* (2013.01); *F05B 2260/4023* (2013.01); *F05B 2260/40311* (2013.01); *Y02E 10/72* (2013.01)

(56) References Cited

U.S. PATENT DOCUMENTS

| | | |
|---|---|---|
| 2005/0205336 A1 | 9/2005 | Yamasaki et al. |
| 2008/0078647 A1* | 4/2008 | Watanabe ............. F16D 41/064 192/41 A |
| 2012/0020792 A1 | 1/2012 | Frank |
| 2012/0045335 A1 | 2/2012 | Heidenreich et al. |
| 2012/0201679 A1 | 8/2012 | Heidenreich et al. |
| 2013/0062886 A1 | 3/2013 | Fujiwara et al. |
| 2015/0061436 A1 | 3/2015 | Fujiwara et al. |
| 2016/0010629 A1 | 1/2016 | Fujiwara et al. |
| 2016/0017934 A1 | 1/2016 | Fujiwara |
| 2016/0025073 A1 | 1/2016 | Fujiwara et al. |
| 2017/0009748 A1 | 1/2017 | Fujiwara |

FOREIGN PATENT DOCUMENTS

| | | |
|---|---|---|
| EP | 2985461 A1 | 2/2016 |
| JP | 2006-183755 A | 7/2006 |
| JP | 2006-250034 A | 9/2006 |
| JP | 2011-085192 A | 4/2011 |
| JP | 2013-060825 A | 4/2013 |
| JP | 2013-076395 A | 4/2013 |
| JP | 2013-110844 A | 6/2013 |
| JP | 2014-199051 A | 10/2014 |

OTHER PUBLICATIONS

Jan. 22, 2018 Office Action issued in Chinese Patent Application No. 201480047625.1.
Nov. 25, 2014 Search Report issued in International Patent Application No. PCT/JP2014/072572.
Translation of Nov. 25, 2014 Written Opinion issued in International Patent Application No. PCT/JP2014/072572.
Mar. 1, 2016 International Preliminary Report on Patentabilty issued in International Patent Application No. PCT/JP2014/072572.
Apr. 21, 2017 Office Action Issued in U.S. Appl. No. 14/913,481.
May 3, 2017 Extended European Search Report issued in European Patent Application No. 14840379.3.
Sep. 4, 2018 Office Action issued in Chinese Patent Application No. 201480047625.1.
Yang, Hong et al., Course Design Instructions for Basis of Mechanical Designing, "Chapter 2, Mechanical Transmission Device and Component Design Thereof," Nanjing University Press, pp. 27-31, Aug. 2012, Edition 1.

\* cited by examiner

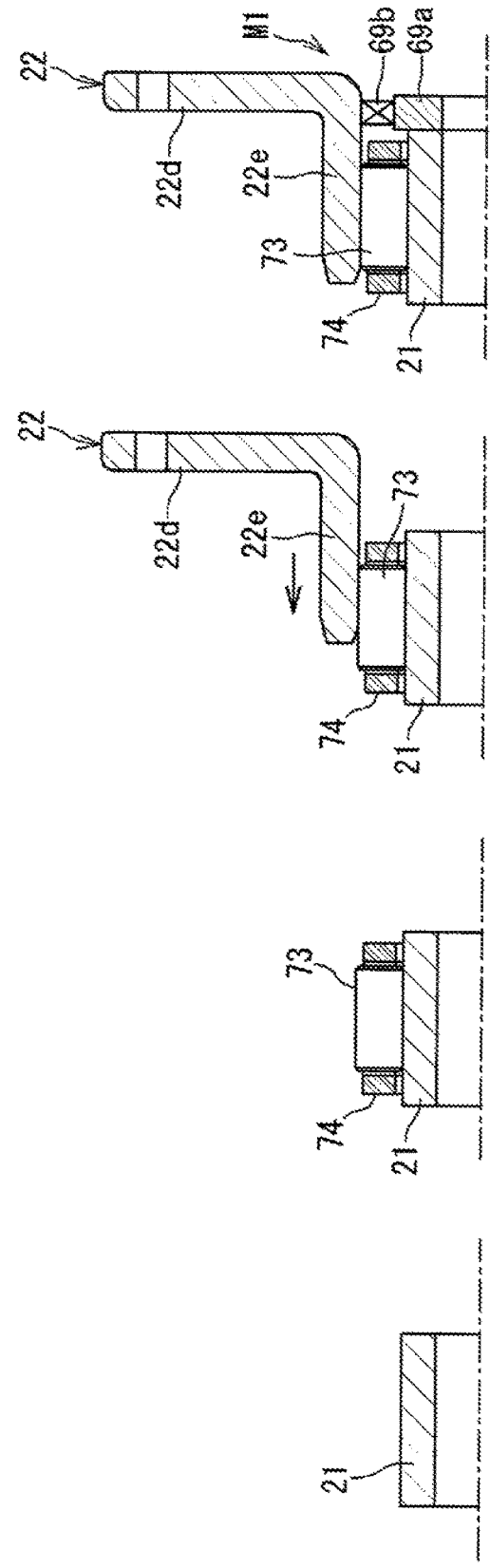

JOINT STRUCTURE AND WIND POWER GENERATION DEVICE

CROSS-REFERENCE TO RELATED APPLICATIONS

This is a Division of application Ser. No. 14/913,481 filed Feb. 22, 2016, which in turn is a U.S. National Stage of PCT Application No. PCT/JP2014/072572, filed Aug. 28, 2014, which claims priority to Japanese Patent Application Nos. 2013-178228, filed Aug. 29, 2013, and 2013-220888, filed Oct. 24, 2014. The disclosure of the prior applications is hereby incorporated by reference herein in its entirety.

TECHNICAL FIELD

An aspect of the present invention relates to a joint structure used for a wind power generation device, and the wind power generation device.

BACKGROUND ART

As a wind power generation device, there is known a device provided with a power generator having a blade that rotates by receiving wind power, a main shaft connected to the blade, a speed increaser that increases the rotation speed of the main shaft and an input shaft coupled to the output shaft of the speed increaser. In this wind power generation device, the blade receives wind power to rotate the main shaft, and the speed of the rotation of the main shaft is increased by the speed increaser to drive the power generator, whereby power generation is performed.

In this wind power generation device, typically, as shown in FIG. 21, an output shaft 111 of a speed increaser 110 and an input shaft 113 of a power generator 114 are connected by a shaft joint 112.

Moreover, since a misalignment such as decentering or angle deviation sometimes occur between the output shaft 111 and the input shaft 113 in the assembly of the wind power generation device, a flexible shaft joint is provided between the shafts 111 and 113 in some devices (for example, see Patent Document 1).

In the speed increaser of the wind power generation device, a roller bearing that rotatably supports the output shaft rotating at high speed is provided, and the roller bearing has a problem in that the life is shortened by smearing phenomenon in which surface seizure occurs) occurring on the rolling surface of the roller and the raceway surfaces of the rotating rings such as the inner ring and the outer ring. Accordingly, the applicant of the present application made earnest researches on the occurrence mechanism of the smearing, found that provision of a one-way clutch between the output shaft of the speed increaser and the input shaft of the power generator is effective in suppressing the occurrence of the smearing, and has already proposed an invention related thereto (see Patent Document 2).

RELATED ART DOCUMENTS

Patent Documents

Patent Document 1: JP-A-2006-250034
Patent Document 2: JP-A-2013-76395

SUMMARY OF THE INVENTION

Problem to be Solved by the Invention

Further, the applicant of the present application has proposed a shaft joint device capable of absorbing a misalignment as described above occurring between the output shaft of the speed increaser and the input shaft of the power generator and capable of suppressing the occurrence of the smearing (Japanese Patent Application No. 2013-048573). This patent application had not been published as of the priority dates of the present application, Aug. 29, 2013 and Oct. 24, 2013. Hereinafter, this shaft joint device will be referred to as proposed joint.

Accordingly, a wind power generation device is considered that adopts the proposed joint instead of the shaft joint 112 shown in FIG. 21. However, in some kinds of wind power generation devices, the axial length (design length) of the shaft joint 112 is short and the proposed joint cannot be incorporated instead of the shaft joint 112. In this case, it is difficult to obtain a structure as described above for suppressing the occurrence of the smearing. In particular, when the shaft joint 112 is changed to the proposed joint in an existing wind power generation device provided with the shaft joint 112 shown in FIG. 21, the change is impossible if the axial length (design length) of the shaft joint 112 is short.

Accordingly, an object of an aspect of the present invention is to provide new technical means that makes it possible to suppress the occurrence of the smearing as described above even in a wind power generation device in which the proposed joint cannot be incorporated instead of the shaft joint connecting the output shaft of the speed increaser and the input shaft of the power generator.

Means for Solving the Problem (1) A first aspect of the present invention includes a joint structure used for a wind power generation device which generates power by rotating an input shaft of a power generator by a torque from an output shaft of a speed increaser, the joint structure including: a clutch unit interposed between: a shaft joint which is provided between the output shaft and the input shaft and which allows the torque to be transmitted between the output shaft and the input shaft; and a shaft body which is one of the output shaft and the input shaft, wherein the clutch unit includes: a shaft coupling portion which rotates integrally with the shaft body; a joint coupling portion which rotates integrally with the shaft joint; and a one-way clutch provided between the shaft coupling portion and the joint coupling portion, and wherein the one-way clutch makes a connection integrally rotatably between the shaft coupling portion and the joint coupling portion in a state in which a rotation speed of the output shaft is higher than a rotation speed of the input shaft, and releases the connection between the shaft coupling portion and the joint coupling portion in a state in which the rotation speed of the output shaft is lower than the rotation speed of the input shaft.

According to the first aspect of the present invention, since the clutch unit including the one-way clutch for suppressing the occurrence of the smearing is interposed between the output shaft of the speed increaser and the shaft joint or between the shaft joint and the input shaft of the power generator, a joint structure is obtained in which even if there is no space enough to provide the one-way clutch in the area of the shaft joint, the occurrence of the smearing as described above can be suppressed.

(2) Preferably, the shaft coupling portion is formed of a member separate from the shaft body and coupled to the shaft body, and the joint coupling portion is formed of a member separate from the shaft joint and coupled to the shaft joint.

In this case, the joint structure can be incorporated while the existing shaft joint of the existing wind power generation device is retained as it is.

(3) Preferably, the shaft coupling portion of the above (2) includes a coupling shaft portion which is coupled to the shaft body, a hole extending in an axial direction is formed on an end portion of one of the coupling shaft portion and the shaft body, and an insertion shaft portion inserted in the hole and incapable of relatively rotating but capable of moving in the axial direction with respect to the hole is formed on an end portion of the other of the coupling shaft portion and the shaft body.

In this case, a structure is obtained in which even if the axial length is changed by thermal expansion and contraction in the part from the output shaft to the input shaft, the change can be absorbed by the relationship between the insertion shaft portion and the hole and the torque can be transmitted from the output shaft to the input shaft.

(4) Preferably, the hole of the above (3) is a spline hole, and the insertion shaft portion is a spline shaft. With this, the structure of the above (3) can be obtained.

(5) Moreover, in the joint structure, preferably, one of the shaft coupling portion and the joint coupling portion is formed of a shaft-shaped member, the other of the shaft coupling portion and the joint coupling portion is formed of a tubular member situated radially outside the shaft-shaped member, the one-way clutch is interposed between the shaft coupling portion and the joint coupling portion and includes an engagement element which is capable of making an engagement with the shaft coupling portion and the joint coupling portion in a state in which the rotation speed of the output shaft is higher than the rotation speed of the input shaft and which releases the engagement in a state in which the rotation speed of the output shaft is lower than the rotation speed of the input shaft, and the clutch unit further includes a rolling bearing interposed between the shaft coupling portion and the joint coupling portion.

In this case, by the engagement element engages the shaft coupling portion and the joint coupling portion, the shaft coupling portion and the joint coupling portion can be integrally rotatably connected, and by releasing the engagement, the connection is also released. Even when the engagement of the engagement element is released, the shaft coupling portion and the joint coupling portion can be concentrically supported by the rolling bearing.

(6) Moreover, in the joint structure of the above (2), preferably, a male screw is formed on an end portion of the shaft body, a female screw, which is screwed with the male screw such that rotation of the female screw is locked in a tightening direction in a state in which tightening with the male screw is completed, is formed on the shaft coupling portion, and the tightening direction is set to a same direction as a rotation direction of the output shaft and the input shaft at a time of power generation by the power generator. With this structure, the coupling between the shaft body and the shaft coupling portion is easily performed.

(7) Moreover, in the joint structure of the above (6), preferably, one of the shaft coupling portion and the joint coupling portion is formed of a tubular member, the other of the shaft coupling portion and the joint coupling portion is formed of a shaft-shaped member situated radially inside the tubular member, and the clutch unit further includes a support portion which supports the shaft coupling portion and the joint coupling portion such that the shaft coupling portion and the joint coupling portion are relatively movable in an axial direction and relatively rotatable.

In this case, even if the axial length is changed by thermal expansion and contraction in the part from the output shaft to the input shaft, the change can be absorbed by the structure of the shaft coupling portion and the joint coupling portion, and the support portion.

(8) Moreover, in the joint structure of the above (7), preferably, the support portion includes: a plurality of balls interposed between the shaft coupling portion and the joint coupling portion; and a cage which holds the balls at intervals in a circumferential direction. With this structure, the support portion can be realized with a simple structure.

(9) Moreover, in the joint structure of the above (1), preferably, the clutch unit further includes: a support member fixed to a fixed object of the wind power generation device; and a rolling bearing which is provided between the support member and the joint coupling portion and which supports the joint coupling portion rotatably with respect to the support member.

In this case, the joint coupling portion can be rotatably attached to the fixed object of the wind power generation device through the support member and the rolling bearing. For this reason, the load due to the gravity (weight) of the shaft joint acting through the joint coupling portion, the gravity (weight) of the one-way clutch provided between the joint coupling portion and the shaft coupling portion and the gravity (weight) of the joint coupling portion itself is transmitted to the fixed object and the fixed object can support this load.

(10) Moreover, in the joint structure of the above (9), preferably, the joint coupling portion includes: a rotational flange portion coupled to the shaft joint; and a rotational cylindrical portion which rotates integrally with the rotational flange portion and in which the one-way clutch is provided on an inner periphery side of the rotational cylindrical portion, the support member includes: a fixed flange portion coupled to the fixed object; and a fixed cylindrical portion which is integral with the fixed flange portion, which is concentric with the rotational cylindrical portion and which is situated radially outside the rotational cylindrical portion, and the rolling bearing is provided between an inner peripheral surface of the fixed cylindrical portion and an outer peripheral surface of the rotational cylindrical portion.

In this case, the resultant structure is such that the one-way clutch is provided on the inner periphery side of the rotational cylindrical portion of the joint coupling portion and the rolling bearing is provided on the outer periphery side of the rotational cylindrical portion. That is, the arrangement is such that the one-way clutch and the rolling bearing are aligned in the radial direction, so that the axial dimension of the joint structure can be reduced.

(11) Moreover, in the joint structure of the above (10), a raceway of the rolling element of the rolling bearing is provided on the inner peripheral surface of the fixed cylindrical portion, and the fixed cylindrical portion also serves as an outer ring of the rolling bearing, whereby the number of parts can be reduced, and the reduction in the number of parts facilitates assembly.

(12) Moreover, in the joint structure of the above (10) or (11), a raceway of the rolling element of the rolling bearing is provided on the outer peripheral surface of the rotational cylindrical portion, and the rotational cylindrical portion also serves as an inner ring of the rolling bearing, whereby the number of parts can be reduced, and the reduction in the number of parts facilitates assembly,

(13) Moreover, in the joint structure of the above (9) to (12), the fixed object is a housing of the speed increaser, and the clutch unit is interposed between the shaft joint and the output shaft.

In this case, the load due to the gravities (weights) of the constituent members of the clutch unit and the like is transmitted to the housing of the speed increaser and the housing of the speed increaser can support this load. The housing of the speed increaser is placed, for example, on the floor where the wind power generation device is provided, and is supported by this floor.

(14) Moreover, in the joint structure of the above (9) to (12), the fixed object is a housing of the power generator, and the clutch unit is interposed between the shaft joint and the input shaft.

In this case, the load due to the gravities (weights) of the constituent members of the clutch unit and the like is transmitted to the housing of the power generator and the housing of the power generator can support this load. The housing of the power generator is placed, for example, on the floor where the wind power generation device is provided, and is supported by this floor.

(15) Moreover, a second aspect of the present invention includes a wind power generation device including: a main shaft which rotates by wind power; a speed increaser which increases a speed of a rotation of the main shaft, and which outputs the rotation from an output shaft; a power generator which includes an input shaft which rotates with the rotation of the output shaft as an input, and which generates power by a rotation of a rotor which rotates integrally with a rotation of the input shaft; a shaft joint which is provided between the output shaft and the input shaft, and which allows a torque to be transmitted between the output shaft and the input shaft; and the joint structure of any one of the above (1) to (14) interposed between the shaft joint and a shaft body which is one of the output shaft and the input shaft.

Advantages of the Invention

According to the aspects of the present invention, a joint structure can be obtained in which even if there is no space enough to provide the one-way clutch in the area of the shaft joint, the occurrence of the smearing can be suppressed on the rolling bearing.

BRIEF DESCRIPTION OF THE DRAWINGS

FIGS. 19(A) to 19(D) are explanatory views explaining an assembly method of the clutch unit.

MODE FOR CARRYING OUT THE INVENTION

Hereinafter, an embodiment of the present invention will be described with reference to the attached drawings.

[General Structure]

Figure 1:
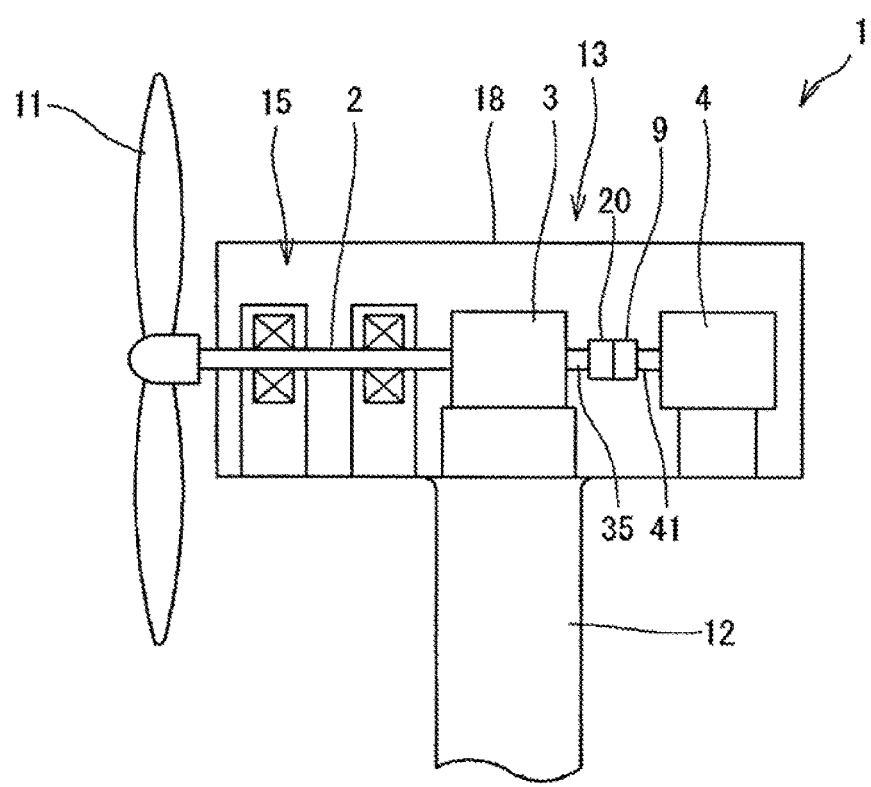
FIG. 1 is a schematic side view of a wind power generation device provided with a joint structure according to an embodiment of the present invention.

FIG. 1 is a schematic side view of a wind power generation device 1 provided with a joint structure according to the embodiment of the present invention. The wind power generation device 1 has a structure in which an input shaft 41 of a power generator 4 is rotated by the torque from an output shaft 35 of a speed increaser 3 to thereby generate power, and the joint structure according to the embodiment of the present invention is used for this wind power generation device 1.

Further describing this structure, the wind power generation device 1 is provided with a blade (wind receiving member) 11, a strut 12 and a nacelle 13. The blade 11 is formed of a plurality of blades provided at an end of a main shaft 2, and rotates the main shaft 2 by receiving wind. The nacelle 13 is provided with the main shaft 2, a support mechanism 15 for supporting the main shaft 2, the speed increaser 3 that increases the rotation speed of the main shaft 2, the power generator 4 that generates power by the rotation power increased in speed by the speed increaser 3, a casing 18 accommodating these, and the like. The strut 12 supports the nacelle 13 in such a manner that it can rotate horizontally about the shaft center in the vertical direction.

Figure 2:
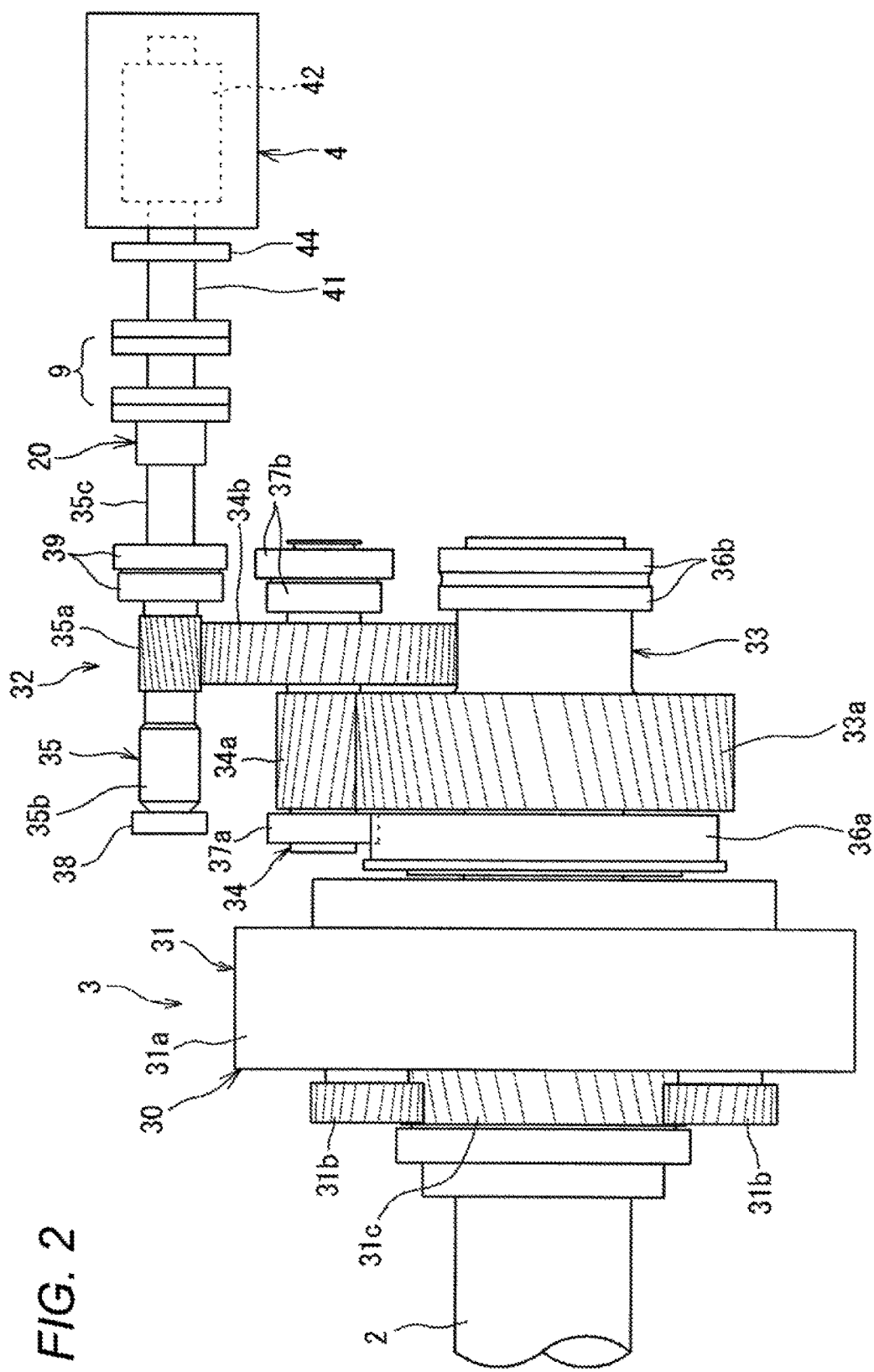
FIG. 2 is a schematic side view showing a speed increaser and a power generator.

FIG. 2 is a schematic side view showing the speed increaser 3 and the power generator 4. The power generator 4 is formed of, for example, an induction power generator, and has the input shaft 41 that rotates by receiving the rotation increased in speed by the speed increaser 3, a rotor 42 incorporated in the power generator 4, a non-illustrated stator, and the like. The rotor 42 is coupled to the input shaft 41 in such a manner that it is rotatable integrally therewith, and the power generator 4 generates power as the input shaft 41 rotates to drive the rotor 42. Moreover, the input shaft 41 is provided with a brake 44 for braking the input shaft 41.

The speed increaser 3 is provided with a gear mechanism (rotation transmission mechanism) 30 that receives the rotation of the main shaft 2 and increases it in speed. The gear mechanism 30 is provided with a planet gear mechanism 31 and a high-speed stepped gear mechanism 32 that receives the rotation increased in speed by the planet gear mechanism 31 and further increases the speed of the rotation.

The planet gear mechanism 31 has an internal gear (ring gear) 31a, a plurality of planet gears 31b held by a planet carrier (not shown) coupled to the main shaft 2 in such a manner that it is rotatable integrally therewith, and a sun gear 31c meshing with the planet gears 31b. Thereby, when the planet carrier rotates together with the main shaft 2, the sun gear 31c rotates through the planet gears 31b, and the rotation is transmitted to a low-speed shaft 33 of the high-speed stepped gear mechanism 32.

The high-speed stepped gear mechanism 32 is provided with the low-speed shaft 33 having a low-speed gear 33a, an intermediate shaft 34 having a first intermediate gear 34a and a second intermediate gear 34b, and the output shaft 35 having a high-speed gear 35a.

The low-speed shaft 33 is formed of a large-size rotation shaft the diameter of which is, for example, approximately 1 m, and is disposed concentrically with the main shaft 2. Both end portions of the low-speed shaft 33 in the axial direction are rotatably supported by rolling bearings 36a and 36b.

The intermediate shaft 34 is disposed parallel to the low-speed shaft 33, and both end portions thereof in the axial direction are rotatably supported by rolling bearings 37a and 37b. The first intermediate gear 34a of the intermediate shaft 34 meshes with the low-speed gear 33a, and the second intermediate gear 34b meshes with the high-speed gear 35a.

The output shaft 35 is disposed parallel to the intermediate shaft 34, and outputs a running torque. The sides of one end portion 35b and the other end portion (output end portion) 35c of the output shaft 35 in the axial direction are rotatably supported by roller bearings 38 and 39, respectively.

By the above structure, the rotation of the main shaft 2 is increased in speed in three steps by the gear ratio of the planet gear mechanism 31, the gear ratio between the low-speed gear 33a and the first intermediate gear 34a and the gear ratio between the second intermediate gear 34b and the high-speed gear 35a, and is outputted as a rotation from the output end portion 35c of the output shaft 35. That is, the rotation of the main shaft 2 by wind power is increased in speed in three steps by the speed increaser 3, is outputted from the output shaft 35, and drives the power generator 4 by the running torque of the output shaft 35.

[Roller Bearing 38]

Figure 3:
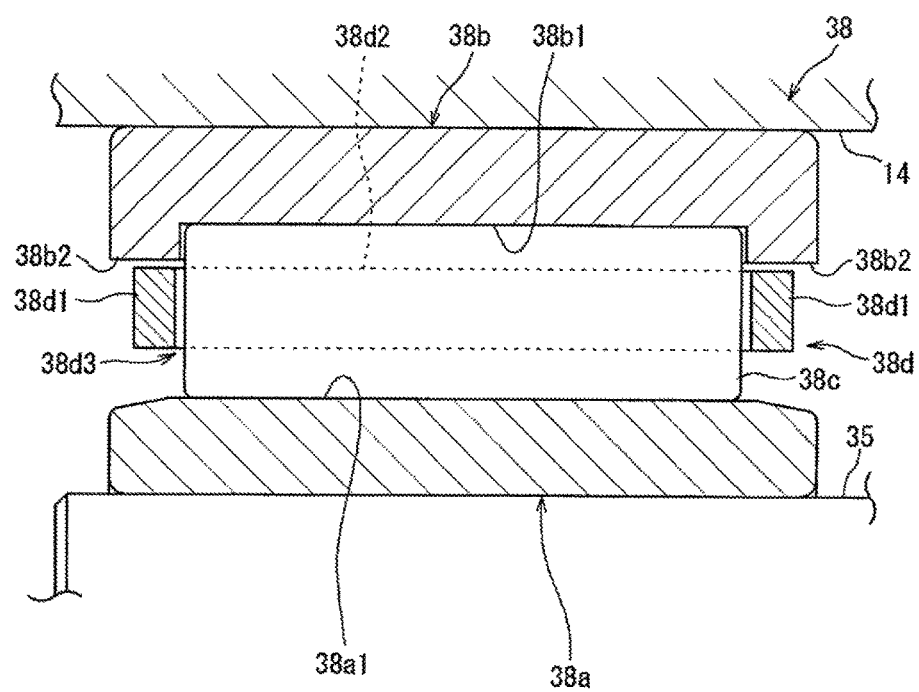
FIG. 3 is a cross-sectional view showing a roller bearing of the speed increaser.

FIG. 3 is a cross-sectional view showing the roller bearing 38 of the speed increaser 3. The roller bearing 38 is formed of a cylindrical roller bearing, and is provided with an inner ring 38a externally fitted and fixed onto the output shaft 35, an outer ring 38b fixed to a housing 14 of the speed increaser 3, a plurality of cylindrical rollers 38c disposed between the inner ring 38a and the outer ring 38b in such a manner that it is rollable, and a ring-shaped cage 38d holding the cylindrical rollers 38c at predetermined intervals in the circumferential direction. The inner ring 38a, the outer ring 38b and the cylindrical rollers 38c are made of, for example, bearing steel, and the cage 38d is made of, for example, a copper alloy.

The inner ring 38a has an inner ring raceway surface 38a1 formed in a central part of its outer periphery in the axial direction. The outer ring 38b is disposed concentrically with the inner ring 38a, and has an outer ring raceway surface 38b1 formed in a central part of its inner periphery in the axial direction. The outer ring raceway surface 38b1 is disposed in such a manner that it faces the inner ring raceway surface 38a1. Moreover, the outer ring 38b has a pair of outer ring rib portions 38b2 formed on both sides in the axial direction. The outer ring rib portions 38b2 are so formed as to protrude from both end portions of the inner periphery of the outer ring 38b in the axial direction toward the inside in the radial direction, and the end surfaces of the cylindrical rollers 38c are in sliding contact with the outer ring rib portions 38b2.

The cylindrical rollers 38c are rollably disposed between the inner ring raceway surface 38a1 and the outer ring raceway surface 38b1.

The cage 38d has a pair of annular portions 38d1 disposed in such a manner that they are separated in the axial direction and a plurality of strut portions 38d2 spaced uniformly in the circumferential direction of the annular portions 38d1 and coupling the annular portions 38d1 together. Between the pair of annular portions 38d1 and the adjoining strut portions 38d2, pockets 38d3 are formed, respectively, and in the pockets 38d3, the cylindrical rollers 38c are disposed, respectively. In the large-size wind power generation device 1, since a high load is applied to the rolling bearing supporting the output shaft 35 of the speed increaser 3, it is preferable to use the roller bearing 38 that is high in rigidity and capable of suitably absorbing the axial expansion and contraction of the output shaft 35 due to heat. Here, as the rolling bearing, a ball bearing or a tapered roller bearing may be used.

[Shaft Joint 9 and Clutch Unit 20]

In FIG. 2, the wind power generation device 1 is provided with a shaft joint 9 provided between the output shaft 35 of the speed increaser 3 and the input shaft 41 of the power generator 4 and for enabling the torque to be transmitted between the output shaft 35 and the input shaft 41. In the present embodiment, a clutch unit 20 is interposed between the shaft joint 9 and the output shaft 35. The clutch unit 20 is provided on the speed increaser 3 side of the brake 44 for the input shaft 41.

Figure 4:
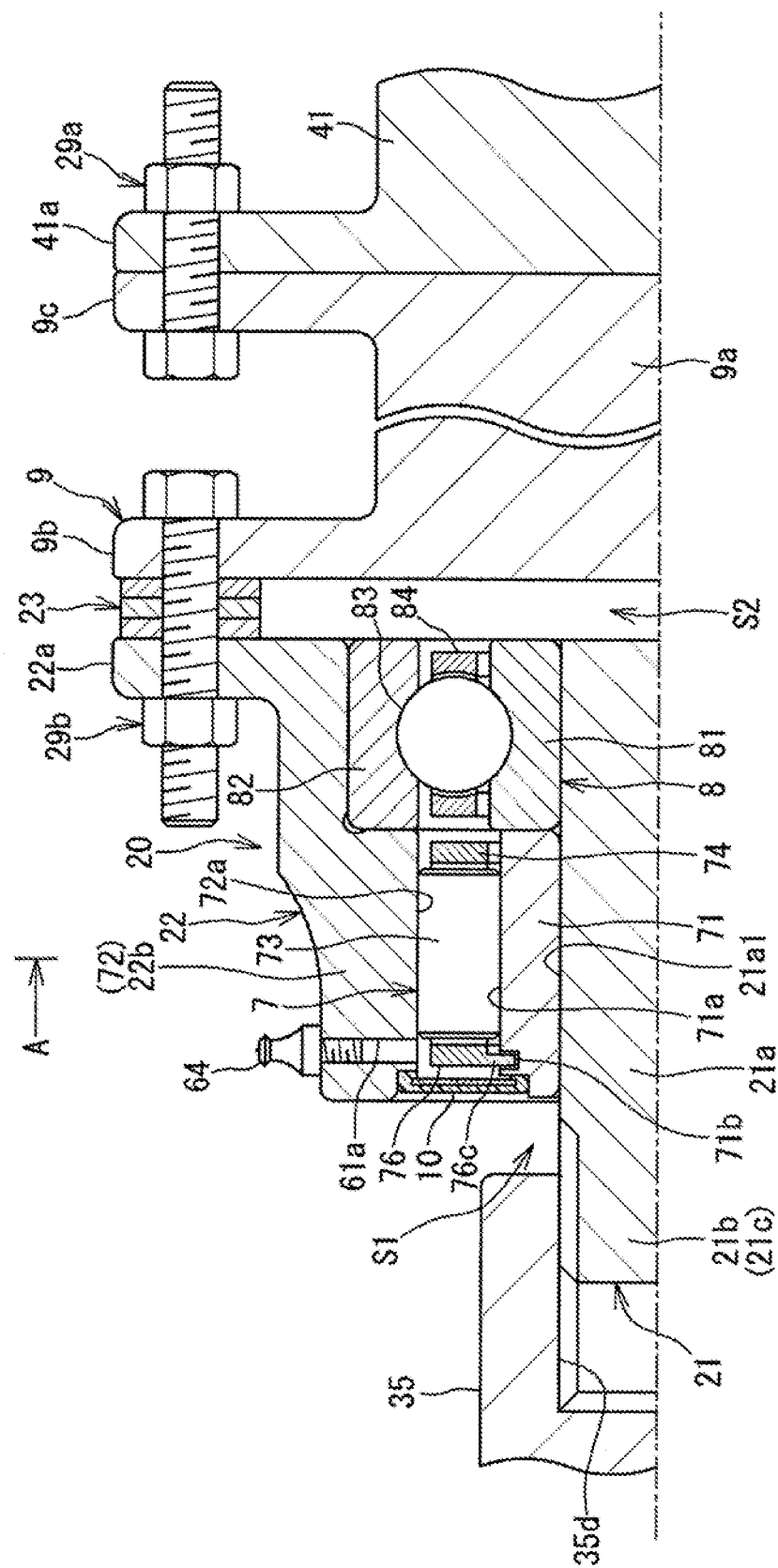
FIG. 4 is a longitudinal cross-sectional view showing a shaft joint, a clutch unit and surroundings thereof.

FIG. 4 is a longitudinal cross-sectional view showing the shaft joint 9, the clutch unit 20 and surroundings thereof. The shaft joint 9 is a member provided in an area between the output shaft 35 and the input shaft 41 and enabling the torque to be transmitted between the output shaft 35 and the input shaft 41. The shaft joint 9 has a shaft main portion 9a and flange portions 9b and 9c fixed to both end portions of the shaft main portion 9a. To the flange portion 9c, a flange portion 41a fixed to the end portion of the input shaft 41 is coupled and fixed by a bolt/nut 29a The shaft joint 9 functions as a torque transmission shaft for transmitting the running torque inputted from the side of the output shaft 35 to the side of the input shaft 41.

In FIG. 4, the clutch unit 20 has a shaft coupling portion 21 rotating integrally with the output shaft 35, a joint coupling portion 22 rotating integrally with the shaft joint 9 and a one-way clutch 7 provided between the shaft coupling portion 21 and the joint coupling portion 22. Further, the clutch unit 20 has a rolling bearing 8 interposed between the shaft coupling portion 21 and the joint coupling portion 22.

In the present embodiment, the shaft coupling portion 21 is formed of a shaft-shaped member separate from the output shaft 35 and coupled to the output shaft 35, and the joint coupling portion 22 is formed of a member separate from the shaft joint 9 and coupled to the shaft joint 9.

The shaft coupling portion 21 has a shaft main portion 21a an outer peripheral surface 21a1 of which is formed of a cylindrical surface and a coupling shaft portion 21b for coupling to the output shaft 35. On the contrary, a hole 35d extending in the axial direction is formed on the end portion of the output shaft 35. An insertion shaft portion 21c inserted in the hole 35d is formed on the end portion of the coupling shaft portion 21b. The hole 35d is formed of a spline hole, and the insertion shaft portion 21c is a spline shaft. For this reason, the shaft coupling portion 21 (the insertion shaft portion 21c) which is movable in the axial direction with respect to the output shaft 35 (the hole 35d) is not rotatable relatively.

Since the shaft coupling portion 21 which is movable in the axial direction with respect to the output shaft 35 is not rotatable relatively as described above, a structure is obtained in which even if the axial length is changed by thermal expansion and contraction due to a temperature rise or a temperature fall in the part from the output shaft 35 by way of the shaft joint 9 to the input shaft 41, the change can be absorbed by the relationship between the insertion shaft portion 21c and the hole 35d and the torque can be transmitted from the output shaft 35 by way of the shaft joint 9 to the input shaft 41.

The members where the hole 35d and the insertion shaft portion 21c are provided may be opposite. That is, although not shown, a structure may be adopted in which the spline hole is formed on the shaft coupling portion 21 and the spline shaft is formed on the output shaft 35.

While the shaft coupling portion 21 is formed of a shaft-shaped member, the joint coupling portion 22 is formed of a cylindrical member situated radially outside the shaft-shaped member. The joint coupling portion 22 has a flange portion 22a. By this flange portion 22a, the joint coupling portion 22 is coupled and fixed to the flange portion 9b of the shaft joint 9 by a bolt/nut 29b with a later-described spacer (a flexible member 23) in between. Moreover, by this bolt/nut 29b, the joint coupling portion 22 is detachably attachable to the shaft joint 9. Moreover, by this detachably attachable structure, the shaft coupling portion 21 is also detachably attachable to the output shaft 35. In order that the joint coupling portion 22 is detachably attachable to the shaft joint 9, an axial space S1 is provided between the joint coupling portion 22 (the one-way clutch 7 attached to the inner periphery side of the joint coupling portion 22) and the output shaft 35. Moreover, in order that the shaft coupling portion 21 is detachably attachable to the output shaft 35, an axial space S2 is provided between the shaft coupling portion 21 and the shaft joint 9. In the space S1, although not shown, a filler formed of an elastic member may be provided.

The one-way clutch 7 is provided in areas facing each other in the radial direction and overlapping each other between the shaft main portion 21a of the shaft coupling portion 21 and a cylindrical main portion 22b of the joint coupling portion 22. Moreover, the rolling bearing 8 is provided only on one side of the one-way clutch 7 in the axial direction (the side of the shaft joint 9) between the shaft main portion 21a and the cylindrical main portion 22b.

The one-way clutch 7 is provided in order that the rotation of the output shaft 35 can be transmitted to the input shaft 41 through the shaft coupling portion 21 and the joint coupling portion 22. The function of the one-way clutch 7 will be described later. The rolling bearing 8 is provided in order that the shaft coupling portion 21 and the joint coupling portion 22 support each other. That is, the rolling bearing 8 is a rolling bearing for supporting the coupling portions.

Moreover, the flexible member 23 is interposed between the shaft joint 9 and the joint coupling portion 22. The flexible member 23 is formed of a plurality of ring-shaped members or disc-shaped members which are each coupled to the flange portions 22a and 9b by the bolt/nut 29b. The flexible member 23 has the function of absorbing a misalignment such as decentering or angle deviation (shaft misalignment) between the output shaft 35 and the input shaft 41 by its own flection (elastic deformation). The structure of the flexible member 23 and the structure of the flange portions 22a and 9b used in combination therewith are not specifically limited, and a background art structure (for example, the structure described in JP-A-2006-250034, etc.) may be adopted if it has the above-described function.

[Oiling Structure]

Between the shaft coupling portion 21 and the joint coupling portion 22, a grease (lubricant) for lubricating the one-way clutch 7 and the rolling bearing 8 disposed thereinside is filled. The clutch unit 20 is provided with sealing means 10 that forms a sealed space for filling the grease between the shaft main portion 21a and the cylindrical main portion 22b which is an area accommodating the one-way clutch 7 and the rolling bearing 8. In the present embodiment, the shaft coupling portion 21 further has an inner ring 71 attached to the outer periphery side of the shaft main portion 21a. This inner ring 71 also functions as the inner ring portion of the one-way clutch 7. Therefore, the sealing space is formed between the inner ring 71 and the cylindrical main portion 22b. The sealing means 10 is provided on the side of the output shaft 35, and although not shown in FIG. 4, another sealing means may be provided on the side of the shaft joint 9. Thereby, the grease is filled between the cylindrical main portion 22b and the shaft main portion 21a, so that the one-way clutch 7 and the rolling bearing 8 can be suitably lubricated. The position of placement of the one-way clutch 7 and the position of placement of the rolling bearing 8 in the sealing space communicate with each other in the axial direction, so that the grease spreads between the one-way clutch 7 and the rolling bearing 8.

The cylindrical main portion 22b has an oiling hole 61a formed so as to pass therethrough in the radial direction from the outer peripheral surface to the inner peripheral surface thereof (the sealing space), and to the oiling hole 61a, a grease nipple (fill opening with a check valve) 64 is attached. While the oiling hole 61a (and the grease nipple 64) are provided on the side of the output shaft 35 of the one-way clutch 7 in the present embodiment, they may be provided in positions corresponding to between the one-way clutch 7 and the rolling bearing 8. Moreover, the oiling hole 61a is provided in a plurality of positions in the circumferential direction, for example, in four positions at even intervals in the circumferential direction, and the grease can be supplied into the sealing space from any of the oiling holes 61a.

Moreover, by detaching the grease nipple 64 of the oiling hole 61a when the grease is supplied from any of the oiling holes 61a, old grease can be discharged from the other oiling holes 61a. Thus, the oiling hole 61a has not only the function as the grease supply portion but also the function as the discharge portion.

Although the position of the oiling hole 61a changes as the joint coupling portion 22 rotates, since the oiling hole 61a is provided more than one in number in the circumferential direction, the oiling hole 61a situated in a position where oiling is easiest can be selected to perform oiling. Therefore, oiling work can be easily performed.

Moreover, when the oiling hole 61a is provided in a position corresponding to between the one-way clutch 7 and the rolling bearing 8, the supply of the grease to these can be performed with reliability. While it is preferable to use, as the grease, one using ester as the base oil and a urea material or the like as the thickener and insusceptible to temperature changes, the present invention is not limited thereto.

[Rolling Bearing 8 and One-Way Clutch 7]

In FIG. 4, the rolling bearing 8 is interposed between the shaft main portion 21a of the shaft coupling portion 21 and the cylindrical main portion 22b of the joint coupling portion 22, and supports the shaft coupling portion 21 and the joint coupling portion 22 in such a manner as to be relatively rotatable with respect to each other. The rolling bearing 8 is formed of a deep groove ball bearing provided with an inner ring 81 and an outer ring 82 as raceway rings, a plurality of balls (rolling elements) 83 disposed so as to be rollable between the inner ring 81 and the outer ring 82 and a cage 84 holding the balls 83 at intervals in the circumferential direction.

Figure 5:
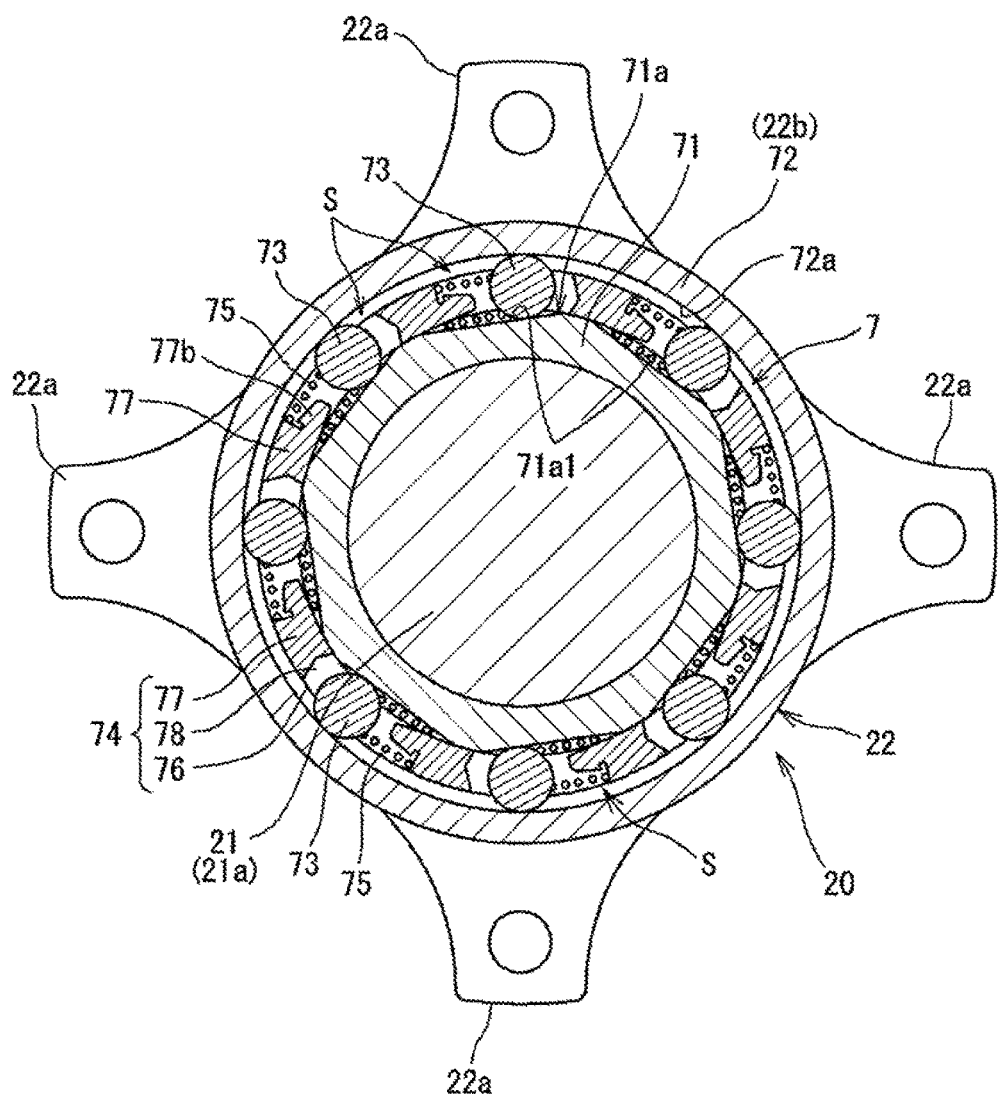
FIG. 5 is a cross-sectional view taken on the arrow A in FIG. 4.

FIG. 5 is a cross-sectional view taken on the arrow A in FIG. 4. As shown in FIG. 4 and FIG. 5, the one-way clutch 7 is provided with an inner ring portion, an outer ring portion and a plurality of rollers (engagement elements) 73. In the present embodiment, the inner ring portion is formed of the inner ring 71 externally fitted on the shaft main portion 21a, and the outer ring portion is formed of part of the cylindrical main portion 22b. In the following, this part of the cylindrical main portion 22b will be called an outer ring 72 of the one-way clutch 7. The outer ring portion is a member separate from the cylindrical main portion 22b, and may be formed of a member fitted and fixed to the inner peripheral surface of the cylindrical main portion 22b.

The inner ring 71 is fixed by being fitted on the shaft main portion 21a, and rotates integrally with the shaft coupling portion 21. The rollers 73 are disposed between an outer peripheral surface 71a of the inner ring 71 and an inner peripheral surface 72a of the outer ring 72. The inner peripheral surface 72a of the outer ring 72 forms the inner peripheral surface 72a where the rollers 73 roll. In the present embodiment, the rollers 73 are formed in a cylindrical shape, and provided eight in number in the circumferential direction (see FIG. 5).

The one-way clutch 7 is further provided with a ring-shaped cage 74 holding the rollers 73 at predetermined intervals in the circumferential direction and a plurality of elastic members (pushing members) 75 elastically pushing the rollers 73 in one direction in the circumferential direction (see FIG. 5).

Figure 6:
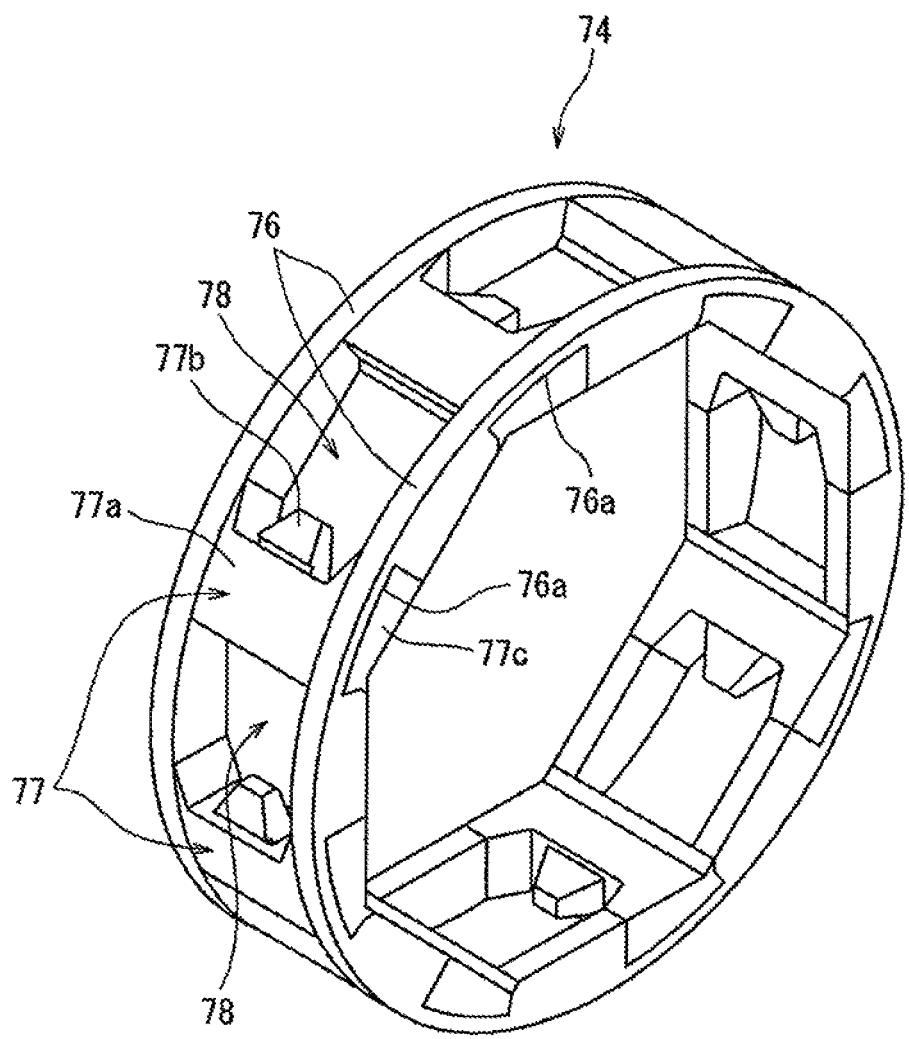
FIG. 6 is a perspective view showing a cage of a one-way clutch.

FIG. 6 is a perspective view showing the cage 74 of the one-way clutch 7. The cage 74 has a pair of ring-shaped portions 76 facing each other in the axial direction and a plurality of strut portions 77 separate from these ring-shaped portions 76 and both axial end portions of which are fitted on the ring-shaped portions 76. Pockets 78 are formed by spaces surrounded by the ring-shaped portions 76 and the circumferentially adjoining strut portions 77, and the rollers 73 are individually accommodated in the pockets 78, respectively (see FIG. 5).

The ring-shaped portions 76 are made of a metallic material such as carbon steel or aluminum, and on the inner peripheries of the ring-shaped portions 76, a plurality of concave portions 76a are formed at predetermined intervals in the circumferential direction.

The strut portion 77 has a main portion 77a, a protruding portion 77b provided so as to protrude on one end surface of the main portion 77a in the circumferential direction and a pair of fitted portions 77c formed on both end portions of the main portion 77a in the axial direction. The main portion 77a, the protruding portion 77b and the fitted portions 77c are integrally molded by injection molding of a synthetic resin material.

The fitted portions 77c are formed so that the radial thickness thereof is smaller than that of the main portion 77a, and the outer peripheral surface of the ring-shaped portion 76 and the outer peripheral surface of the main portion 77a are substantially flush with each other in a state in which the fitted portions 77c are fitted in the concave portions 76a.

The protruding portion 77b is, as shown in FIG. 5, for guiding (positioning) the elastic members 75 accommodated in the pocket 78. The protruding portion 77b is formed so as to be gradually tapered toward the end. The elastic members 75 are loosely fitted from the end side of the protruding portion 77b. The elastic members 75 are formed of compression coil springs formed so as to elongate in the axial direction. The elastic members 75 may be springs of a different form such as leaf springs.

As described above, the cage 74 is formed of the ring-shaped portions 76 and the strut portions 77 and these are formed separately from each other, so that the ring-shaped portions 76 and the strut portions 77 can be manufactured individually. Consequently, the cage 74 can be easily manufactured compared with when the entire cage 74 is integrally manufactured. In particular, since the cage 74 used for the wind power generation device 1 is large in size and it is difficult to manufacture the whole thereof integrally, forming the ring-shaped portions 76 and the strut portions 77 separately from each other is more beneficial. Moreover, by making the ring-shaped portions 76 of a metal, a sufficient strength can be ensured for the cage 74, and by making the strut portions 77 of a synthetic resin, the overall weight of the cage 74 can be reduced.

Moreover, as shown in FIG. 4, on the inner peripheral surface of the ring-shaped portion 76 on one side, a convex portion 76c is formed. On the outer peripheral surface 71a of the inner ring 71, a concave portion 71b where the convex portion 76c is inserted is formed. By the convex portion 76c being inserted in the concave portion 71b, the cage 74 has its axial movement limited, and as a consequence, the rollers 73 have their axial movement limited by the cage 74.

As shown in FIG. 5, flat cam surfaces 71a1 of the same number (eight) as that of the rollers 73 are formed on the outer peripheral surface 71a of the inner ring 71, and the inner peripheral surface 72a of the outer ring 72 is a cylindrical surface. Between the cam surfaces 71a1 and the inner peripheral surface 72a, a plurality of (eight) wedge-shaped spaces S are formed in the circumferential direction.

Figure 7:
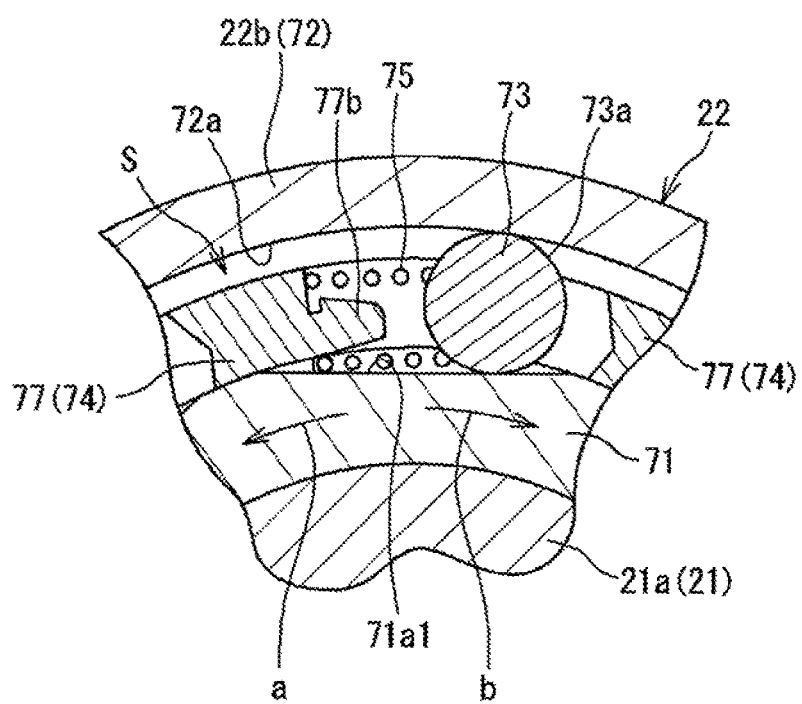
FIG. 7 is a cross-sectional view showing an enlargement of a relevant part of the one-way clutch.

FIG. 7 is a cross-sectional view showing an enlargement of a relevant part of the one-way clutch 7. A plurality of rollers 73 are interposed between the inner ring 71 of the shaft coupling portion 21 and the cylindrical main portion 22b of the joint coupling portion 22. Moreover, the rollers 73 are individually disposed in the wedge-shaped spaces S, respectively. Moreover, the rollers 73 are pushed by the elastic members 75 in a direction in which the wedge-shaped spaces S become narrower. The outer peripheral surface of each roller 73 is a contact surface 73a that is in contact with the cam surface 71a1 of the inner ring 71 and the inner peripheral surface 72a of the outer ring 72 (part of the cylindrical main portion 22b), and this contact surface 73a is formed straightly in the width direction (the axial direction).

In the one-way clutch 7 structured as described above, when the rotation speed of the shaft coupling portion 21 and the inner ring 71 is higher than the rotation speed of the joint coupling portion 22 (the outer ring 72) by the shaft coupling portion 21 and the inner ring 71 integral therewith rotating with increasing speed, the shaft main portion 21a and the inner ring 71 behave so as to relatively rotate in one direction (the counterclockwise direction in FIG. 5; the direction of the arrow a in FIG. 7) with respect to the outer ring 72. In this case, by the pressing force of the elastic members 75, the rollers 73 slightly move in a direction in which the wedge-shaped spaces S become narrower (rightward in FIG. 7) so that the contact surfaces 73a of the rollers 73 are in pressure contact with the outer peripheral surface 71a (the cam surface 71a1; engaged surface) of the inner ring 71 and the inner peripheral surface (engaged surface) 72a of the outer ring 72, which results in a condition where the rollers 73 are engaged between the inner ring 71 and the outer ring 72. This enables the inner ring 71 and the outer ring 72 to integrally rotate in the one direction a, so that the shaft coupling portion 21 and the joint coupling portion 22 can be integrally rotatably connected.

In the present embodiment, as shown in FIG. 4, the shaft coupling portion 21 is integrally rotatable with the output shaft 35 of the speed increaser 3, and the joint coupling portion 22 is integrally rotatable with the input shaft 41 of the power generator 4 through the shaft joint 9. For this reason, in the one-way clutch 7, the shaft coupling portion 21 and the joint coupling portion 22 can be integrally rotatably connected in a state in which the rotation speed of the output shaft 35 is higher than the rotation speed of the input shaft 41. That is, the rollers 73 can engage the outer peripheral surface 71a of the inner ring 71 of the shaft coupling portion 21 and the inner peripheral surface 72a of the cylindrical main portion 22b (the outer ring 72) of the joint coupling portion 22 in a state in which the rotation speed of the output shaft 35 is higher than the rotation speed of the input shaft 41, so that the shaft coupling portion 21 and the joint coupling portion 22 can be integrally rotatably connected. As a consequence, the output shaft 35 rotates integrally with the input shaft 41 through the shaft joint 9.

Moreover, when the rotation of the output shaft 35 (the shaft coupling portion 21) becomes a constant speed rotation after the rotation with increasing speed and the rotation speed of the shaft coupling portion 21 becomes the same as the rotation speed of the input shaft 41 (the joint coupling portion 22), the rollers 73 are held in a state of being engaged between the inner and outer rings 71 and 72. For this reason, the one-way clutch 7 maintains the integral rotation of the inner and outer rings 71 and 72 in the one direction, so that the output shaft 35 (the shaft coupling portion 21) and the input shaft 41 (the joint coupling portion 22) continue to rotate integrally.

On the other hand, when the rotation speed of the shaft coupling portion 21 is lower than the rotation speed of the joint coupling portion 22 by the output shaft 35 decelerating so that the shaft coupling portion 21 rotates with decreasing speed, the inner ring 71 behaves so as to relatively rotate in the other direction (the clockwise direction in FIG. 5; the direction of the arrow b in FIG. 7) with respect to the outer ring 72. In this case, the engagement between the rollers 73 and the inner and outer rings 71 and 72 is released by the rollers 73 slightly moving in a direction in which the wedge-shaped spaces S become wider against the pressing force of the elastic members 75. As described above, the shaft coupling portion 21 and the joint coupling portion 22 are disconnected by the engagement of the rollers 73 being released.

That is, in the one-way clutch 7, the shaft coupling portion 21 and the joint coupling portion 22 are disconnected in a state in which the rotation speed of the output shaft 35 is lower than the rotation speed of the input shaft 41. That is, the engagement of the rollers 73 with the outer peripheral surface 71a of the inner ring 71 of the shaft coupling portion 21 and the inner peripheral surface 72a of the cylindrical main portion 22b (the outer ring 72) of the joint coupling portion 22 is released in a state in which the rotation speed of the output shaft 35 is lower than the rotation speed of the input shaft 41, so that the shaft coupling portion 21 and the joint coupling portion 22 are disconnected. As a consequence, the output shaft 35 is disconnected from the shaft joint 9, so that the output shaft 35 and the input shaft 41 are relatively rotatable (idly rotatable).

While the inner peripheral surface 72a forming the wedge-shaped spaces S is formed of part (arc surface) of a cylindrical surface continuous in the circumferential direction, it may be formed of an arc surface not continuous in the circumferential direction, for example, an independent arc surface such that a flat surface or an inflection point is interposed between the inner peripheral surfaces 72a of the wedge-shaped spaces S adjoining in the circumferential direction.

[Regarding the Action of Increasing the Tightening Force]

In the shaft coupling portion 21, the inner ring 71 is fitted on the shaft main portion 21a by interference fit with a predetermined interference. Consequently, these are integrally rotatable by the tightening force of the inner ring 71 for the shaft main portion 21a. Moreover, the tightening force of the inner ring 71 for the shaft main portion 21a is increased by the engagement between the rollers 73 and the inner and outer rings 71 and 72. Hereinafter, this action will be described.

Figure 8A:
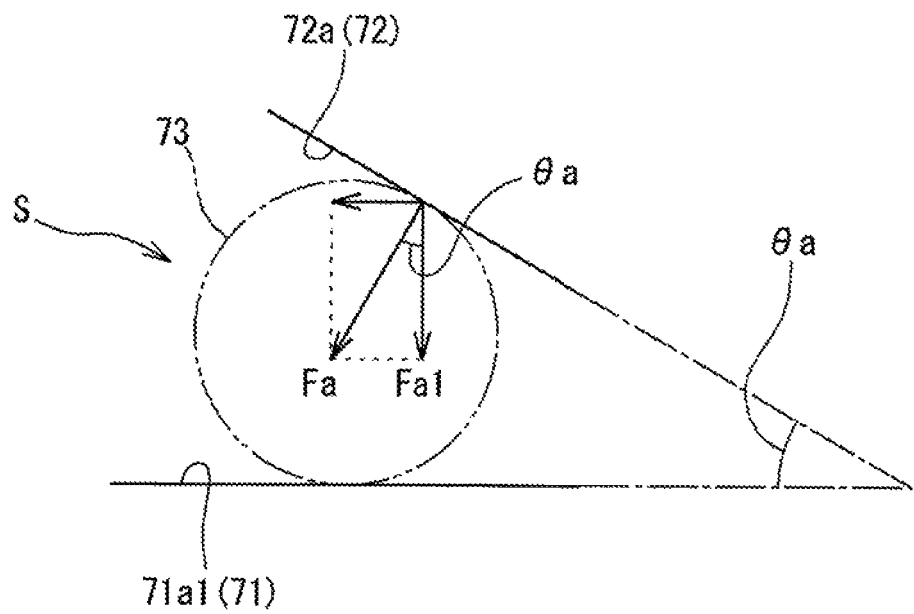
FIGS. 8(a) and 8(b) are explanatory views explaining the action of the one-way clutch.
Figure 8B:
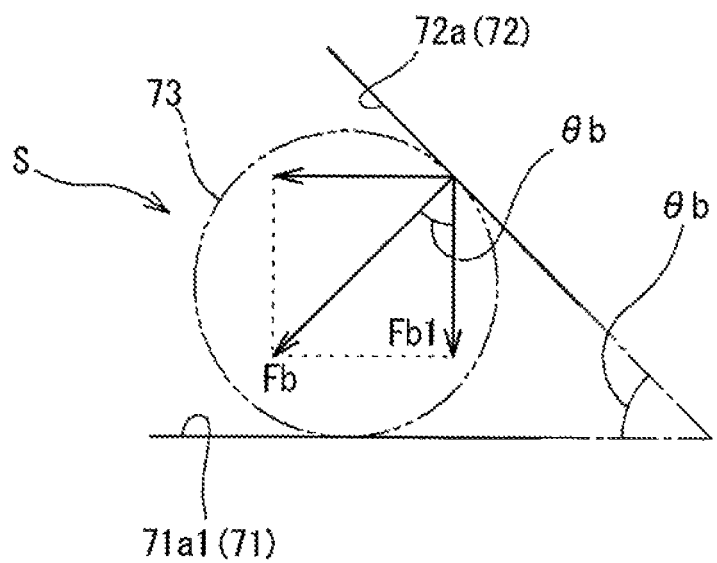

As shown in FIG. 7, when the inner ring 71 behaves so as to relatively rotate in the direction of the arrow a in FIG. 7 with respect to the outer ring 72, the rollers 73 engage with the cam surface 71a1 and the inner peripheral surface 72a, the rollers 73 receive a load Fa (Fb) from the inner peripheral surface 72a as shown in FIG. 8(a) (FIG. 8(b)), and the cam surface 71a1 of the inner ring 71 receives a vertical component load Fa1 (Fb1) which is a component force of the load Fa (Fb) from the rollers 73. Consequently, the tightening force of the inner ring 71 for the shaft main portion 21a is increased by this vertical component load Fa1 (Fb1).

For this reason, a torque (transmission torque) T2 transmittable from the shaft main portion 21a to the inner ring 71 by the tightening force by the fitting between the shaft main portion 21a and the inner ring 71 (hereinafter, referred to as "initial tightening force") can be made lower than the maximum transmission torque T1max to be transmitted from the shaft main portion 21a to the inner ring 71 when the load torque (the power generation torque or the inertia torque for rotating the rotor 42 of the power generator 4) for operating the wind power generation device 1 becomes maximum. That is, T2 and T1max can be set to the following relationship:

$$T1\max > T2 \qquad (1)$$

Moreover, when the transmission torque transmittable from the shaft main portion 21a to the inner ring 71 by the tightening force by the engagement between the rollers 73 and the inner and outer rings 71 and 72 (hereinafter, also referred to as "additional tightening force") is T3, the value obtained by adding T2 and T3 is always higher than a minimum transmission torque T1 necessary for operating the wind power generation device 1. That is, $$T1 < T2 + T3 \tag{2}$$

In particular, by the additional tightening force when the load torque is maximum, a transmission torque T3max transmittable from the shaft main portion 21a to the inner ring 71 satisfies the following condition:

$$T1\max < T2 + T3\max \tag{3}$$

Figure 9:
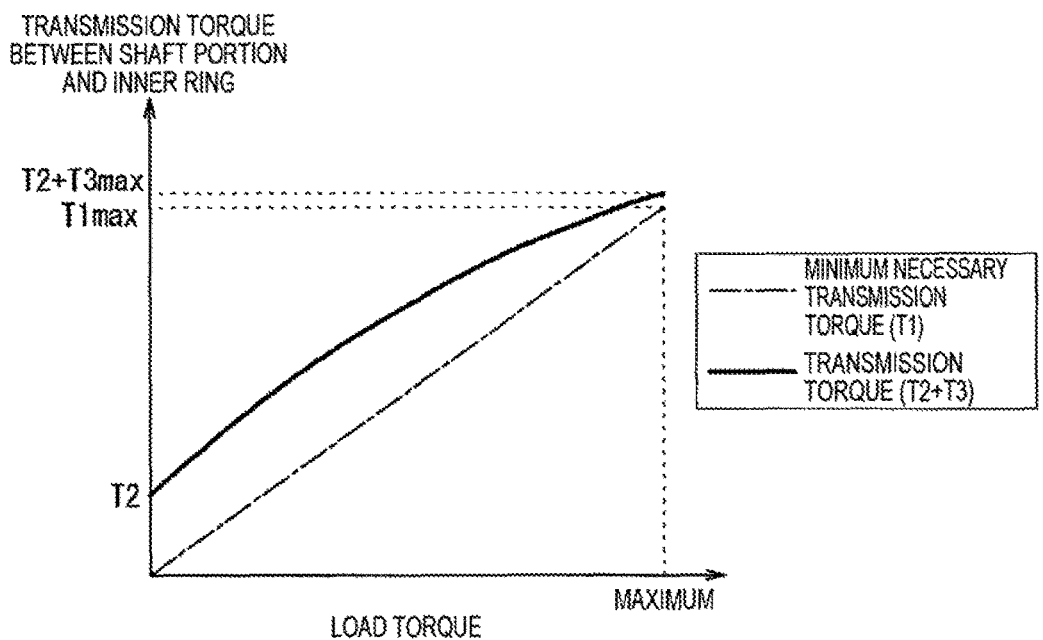
FIG. 9 is a graph explaining the relationship between a load torque and a transmission torque.

The relationship between the load torque and the transmission torques T1 to T3 is as shown by the graph of FIG. 9. The above-mentioned maximum load torque is a maximum load torque assumed as a design condition of the wind power generation device 1 and is not an excessive load torque caused at times such as when the wind power generation device 1 suffers a breakdown or when abrupt wind speed fluctuations exceeding assumptions occur due to an abnormal weather.

By the relationships of the above expressions (1) to (3) being satisfied, the initial tightening force by the fitting between the shaft main portion 21a and the inner ring 71 can be minimized, the interference necessary for the fitting therebetween is reduced, and the internal stress (particularly, the stress in the circumferential direction) caused on the inner ring 71 by the fitting can be reduced. By reducing the internal stress of the inner ring 71, the durability of the inner ring 71 is enhanced, and the life of the one-way clutch 7, consequently, the clutch unit 20 can be enhanced. The interference between the shaft main portion 21a and the inner ring 71 may be 10 μm at the minimum.

By omitting the inner ring 71 of the one-way clutch 7 and forming a cam surface directly on the shaft main portion 21a, the stress concentration on the inner ring 71 accompanying the fitting as described above can be suppressed, which is favorable. However, since the one-way clutch 7 used for the wind power generation device 1 as in the present embodiment is large in size, forming a cam surface directly on the shaft main portion 21a is difficult and impractical. Therefore, it is most effective to set the relationship between the transmission torques T1 to T3 and the load torque like the above expressions (1) to (3).

[Wedge Angle of the Wedge-Shaped Space S]

On the other hand, when the tightening force due to the engagement between the rollers 73 and the inner and outer rings 71 and 72 becomes excessively high with an increase in the load torque, the burden on the inner ring 71 becomes heavy, so that the durability can rather decrease. For this reason, in the present embodiment, as the load torque increases, the increment of the vertical component load applied from the rollers 73 to the inner ring 71 (the cam surface 71a1) with respect to the increment of the load torque is decreased so that the burden on the inner ring 71 can be minimized.

Specifically, since the inner peripheral surface 72a of the outer ring 72 is formed as an arc surface, the wedge angle is larger in an area where the wedge-shaped space S is smaller (see FIG. 7).

FIG. 8(a) shows a condition where the roller 73 is situated in an area where the wedge-shaped space S is comparatively large and the wedge angle θa is small, and FIG. 8(b) shows a condition where the roller 73 is situated in an area where the wedge-shaped space S is comparatively small and the wedge angle θb is large.

Moreover, the time when the roller 73 is situated in an area where the wedge-shaped space S is large is in the early stage of the engagement between the roller 73 and the inner and outer rings 71 and 72, for example, in cases where the load torque is low such as when the cut-in wind speed (the minimum wind speed necessary for power generation) is reached from the non-rotating condition to start rotation and when the rotation becomes constant at the cut-in wind speed and stable, and the time when the roller 73 is situated in an area where the wedge-shaped space S is small is in cases where the load torque is high such as when the wind speed becomes not less than the rated wind speed and reaches the rated output. The cut-in wind speed may be an instantaneous wind speed or may be the average wind speed for a predetermined time.

Therefore, in FIGS. 8(a) and 8(b), the load Fa and the load Fb applied from the inner peripheral surface 72a of the outer ring 72 to the rollers 73 have the following relationship:

$$Fa < Fb \tag{4}$$

In FIG. 8(b), the percentage of the vertical component load Fb1 to the load Fb applied from the inner peripheral surface 72a to the roller 73 (Fb/Fb1) is, in FIG. 8(a), lower than the percentage of the vertical component load Fa1 to the load Fa (Fa/Fa1). For this reason, even if the load torque increases, the vertical component load Fb1 does not become very high, so that the burden on the inner ring 71 can be reduced.

The wedge angle θa when the initial load torque of the engagement between the rollers 73 and the inner and outer rings 71 and 72 acts and the wedge angle θb when the maximum load torque acts are set to the following relationship:

$$1.0° < \theta b - \theta a < 1.5° \tag{5}$$

The wedge angle θa is preferably in a range of 4° to 9°, and the wedge angle θb is preferably in a range of 5.5° to 10°. This is because if the wedge angle θa is smaller than 4°, there is a possibility that the vertical component load Fa1 applied from the rollers 73 to the cam surface 71a1 is higher than necessary and if the wedge angle θa is higher than 9°, the other wedge angle θb is too large so that there is a possibility that the engagement between the rollers and the peripheral surfaces are insufficient. Moreover, this is because if the wedge angle θb is smaller than 5.5°, the other wedge angle θa is too small so that there is a possibility that the vertical component load Fa1 applied from the rollers 73 to the cam surface 71a1 is enhanced more than necessary and if the wedge angle θb is higher than 10°, there is a possibility that the engagement between the rollers 73 and the inner and outer rings 71 and 72 is insufficient.

Moreover, the ratio between the wedge angles θa and θb is set to $$1.1 < \theta b / \theta a < 1.4 \tag{6}$$

(more preferably, 1.11 < θb/θa < 1.38).

By the wedge angles θa and θb being set to the above relationship, during the period from the early stage of the engagement between the rollers 73, and the inner ring 71 and the outer ring 72 to when the load torque becomes maximum, the torque transmission between the shaft main portion 21a and the inner ring 71 can be performed with reliability and the burden on the inner ring 71 can be reduced.

The relationships like the above expressions (5) and (6) can be set by adjusting the inside diameter of the outer ring 72, the outside diameter and P.C.D. of the rollers 73, the distance between the inner peripheral surface 72a and the cam surface 71a1 and the like. Moreover, it is preferable to set the number of rollers 73 of the one-way clutch 7 to four to eight. This is because if the number of rollers 73 is larger than eight, the load Fa (Fb) from the inner peripheral surface 72a to the rollers 73 is dispersed, the vertical component load Fa1 from the rollers 73 to the cam surface 71a1 is low and there is a possibility that the tightening force of the inner ring 71 on the shaft main portion 21a cannot be sufficiently obtained. Moreover, this is because if the number of rollers 73 is smaller than four, the tightening force of the inner ring 71 on the shaft main portion 21a is too high and a local burden on the inner ring 71 is heavy,

[Regarding the Torque Limiter]

Figure 10:
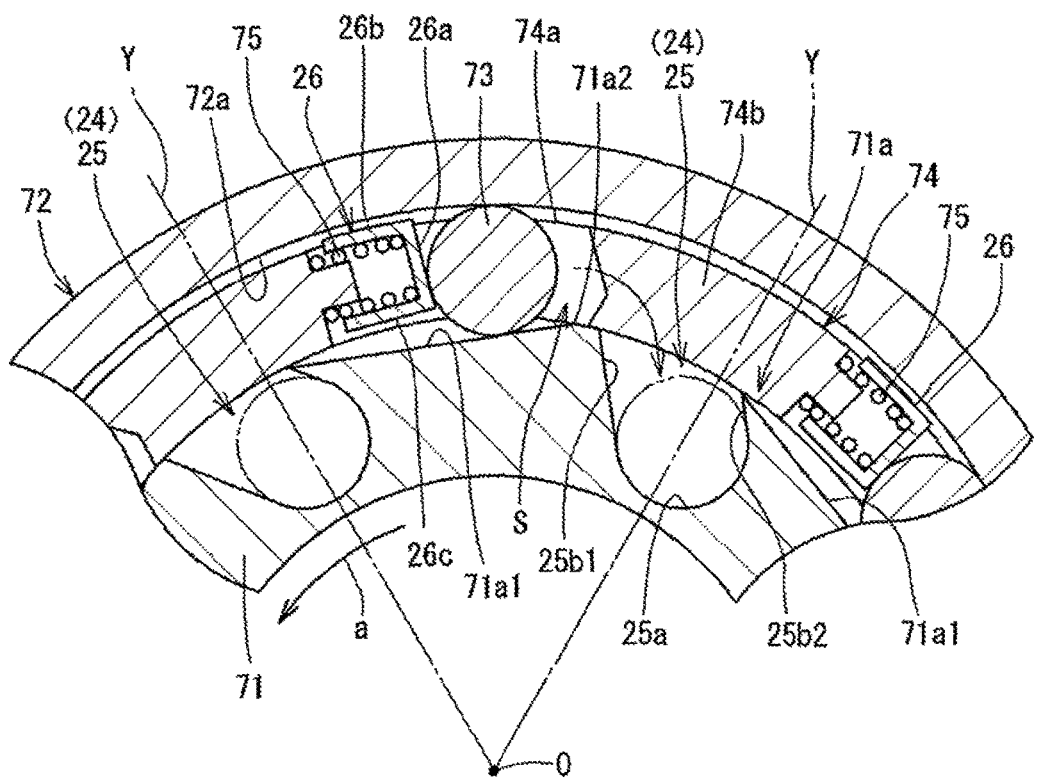
FIG. 10 is a cross-sectional view of the one-way clutch provided with a torque limiter.

The one-way clutch 7 of the present embodiment may be provided with a torque limiter 24 that disconnects the shaft coupling portion 21 and the joint coupling portion 22 when the transmission torque from the shaft coupling portion 21 to the joint coupling portion 22 exceeds a predetermined value (upper limit value). FIG. 10 is a cross-sectional view showing part of the one-way clutch 7 provided with the torque limiter 24.

As described above, in the one-way clutch 7, by the shaft coupling portion 21 rotating with increasing speed in the direction of the arrow a in FIG. 7, the rollers 73 are engaged between the cam surface 71a1 and the inner peripheral surface 72a of the outer ring 72 to integrally rotate the joint coupling portion 22 in the same direction. However, for example, if seizure or the like occurs on the power generator 4 and this makes the input shaft 41 difficult to rotate, the joint coupling portion 22 coupled to the input shaft 41 through the shaft joint 9 is also difficult to rotate, so that the running torque transmitted from the shaft coupling portion 21 to the joint coupling portion 22 is excessive. As a consequence, for example, a heavy burden is placed on the speed increaser 3 between the output shaft 35 coupled to the shaft coupling portion 21 and the main shaft 2, so that there is a possibility that gears, bearings and the like in the speed increaser 3 are damaged.

Accordingly, to solve the inconvenience as described above, the torque limiter 24 is provided. As shown in FIG. 10, concave portions 25 where the rollers 73 can be accommodated are formed on the outer peripheral surface 71a of the inner ring 71. The concave portions 25 are formed between the circumferentially adjoining cam surfaces 71a1. Into each concave portion 25, the roller 73 that can abut on the cam surface 71a1 disposed so as to adjoin in the direction of the arrow a drops when it climbs over an end portion 71a2 of the cam surface 71a1, and accommodated.

The concave portion 25 has its bottom portion 25a formed as an arc surface having substantially the same radius as the roller 73, and side wall portions 25b1 and 25b2 formed on both sides of the bottom portion 25a in the circumferential direction are formed so as to be parallel to each other. The side wall portions 25b1 and 25b2 are formed as inclined surfaces inclined in such a manner that the closer to the outside in the radial direction they are with respect to a radial virtual line Y passing through the shaft center O of the one-way clutch 7 and the center of curvature of the bottom portion 25a, the more they are situated in the direction of the arrow a. For this reason, the side wall portion 25b1 on the side closer to the roller 73 is longer, and the side wall portion 25b2 on the farther side is shorter. Moreover, the angle between the cam surface 71a1 and one side wall portion 25b1 is not less than 90° (for example, approximately 90° to 120°).

Moreover, the concave portion 25 is formed in a depth capable of accommodating the entire roller 73. For this reason, the roller 73 accommodated in the concave portion 25 is situated radially inside the elastic member 75.

The elastic member 75 is provided with a cover member 26. This cover member 26 is formed in a bottomed tube form so as to surround one end surface in the circumferential direction (the end surface on the side of the roller 73), the outer side surface in the radial direction, the inner side surface in the radial direction and both side surfaces in the axial direction of the elastic member 75, and a part 26a covering the one end surface in the circumferential direction abuts on the roller 73. Moreover, a part 26b covering the outer side surface in the radial direction of the elastic member 75 is formed in an arc form along the inner peripheral surface 72a of the outer ring 72, and this part 26b is coated with a fluorocarbon resin, molybdenum disulfide or the like to thereby reduce the frictional resistance so that it can smoothly slide even if it is in contact with the inner peripheral surface 72a of the outer ring 72.

Figure 11:
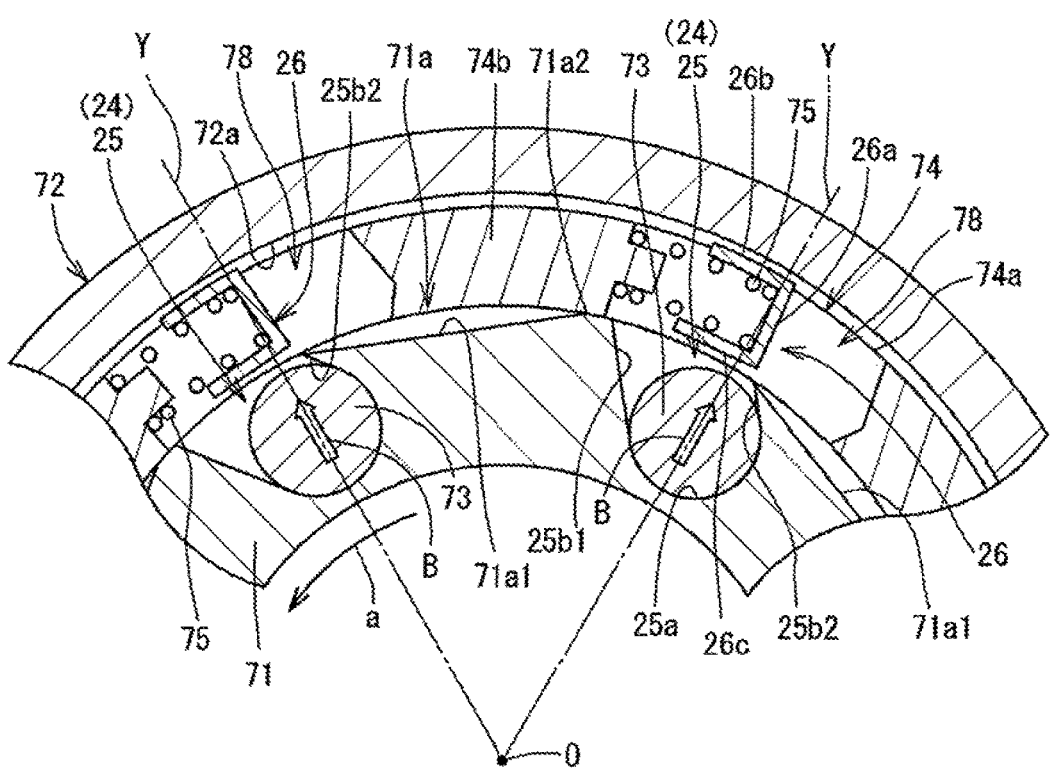
FIG. 11 is a cross-sectional view of the one-way clutch provided with the torque limiter.

When the running torque transmitted from the shaft coupling portion 21 to the joint coupling portion 22 exceeds the upper limit, the roller 73 climbs over the end portion 71a2 from on the cam surface 71a1, and as shown in FIG. 11, drops into the concave portion 25 to be separated from the wedge-shaped space S. Consequently, the shaft coupling portion 21 and the joint coupling portion 22 are completely disconnected, so that the transmission of the running torque therebetween is cut off. Consequently, the shaft coupling portion 21 rotates with hardly any load placed thereon, so that the burden on the speed increaser 3 can be reduced and the damage to the speed increaser 3 can be prevented.

Moreover, as long as the main shaft 2 is rotating, the shaft coupling portion 21 continues rotating with the rotation speed being increased by the speed increaser 3 even after the rollers 73 are accommodated in the concave portions 25; however, if the rollers 73 are separated outward in the radial direction from the concave portions 25 due to the centrifugal force by the rotation of the shaft coupling portion 21 and the rollers 73 again engage the cam surface 71a1 and the inner peripheral surface 72a of the outer ring 72, the shaft coupling portion 21 is connected to the joint coupling portion 22 to be locked, so that a heavy burden is placed on the speed increaser 3. To prevent such a situation, the torque limiter 24 of the present embodiment is provided with separation preventing means for preventing the rollers 73 from separating from the concave portions 25.

Specifically, to form the separation preventing means, one side wall portion (one edge portion in the circumferential direction; restriction portion) 25b2 of the concave portion 25 protrudes outward in the radial direction of the roller 73. That is, even if the roller 73 behaves so as to move outward in the radial direction (the direction of the arrow B along the virtual line Y) due to the centrifugal force, the side wall portion 25b2 of the concave portion 25 is an obstacle to make the movement difficult, so that the separation from the concave portion 25 is prevented. Moreover, since an inertial force in a direction opposite to the arrow a is applied to the roller 73 by the shaft coupling portion 21 rotating in the direction of the arrow a, separation from the concave portion 25 is more difficult.

Moreover, the elastic members 75 and the cover member 26 have the function as the separation preventing means. That is, when the roller 73 on the cam surface 71a1 is dropped into the concave portion 25, the elastic members 75 in the pocket 78 expand, so that the roller 73 is situated radially inside the elastic members 75 and the cover member 26 and at least part of the concave portion 25 is closed by the cover member 26. For this reason, even if the roller 73 behaves so as to move radially outward due to the centrifugal force by the rotation of the shaft coupling portion 21, the elastic members 75 and the cover member 26 are obstacles to inhibit the movement, so that the separation of the roller 73 from the concave portion 25 is suitably prevented. In particular, by the elastic members 75 being provided with the cover member 26, the separation of the roller 73 from the concave portion 25 can be prevented with reliability.

The structure of the torque limiter for preventing a breakdown of the speed increaser 3 and the like may have a different form. For example, the spacer 23 shown in FIG. 4 may function as the torque limiter. That is, in this case, the spacer 23 is made of resin so that the spacer 23 is broken when an abnormal excessive torque is about to act on the output shaft 35 and the like.

[Regarding Another Embodiment of the Clutch Unit 20]

Figure 12:
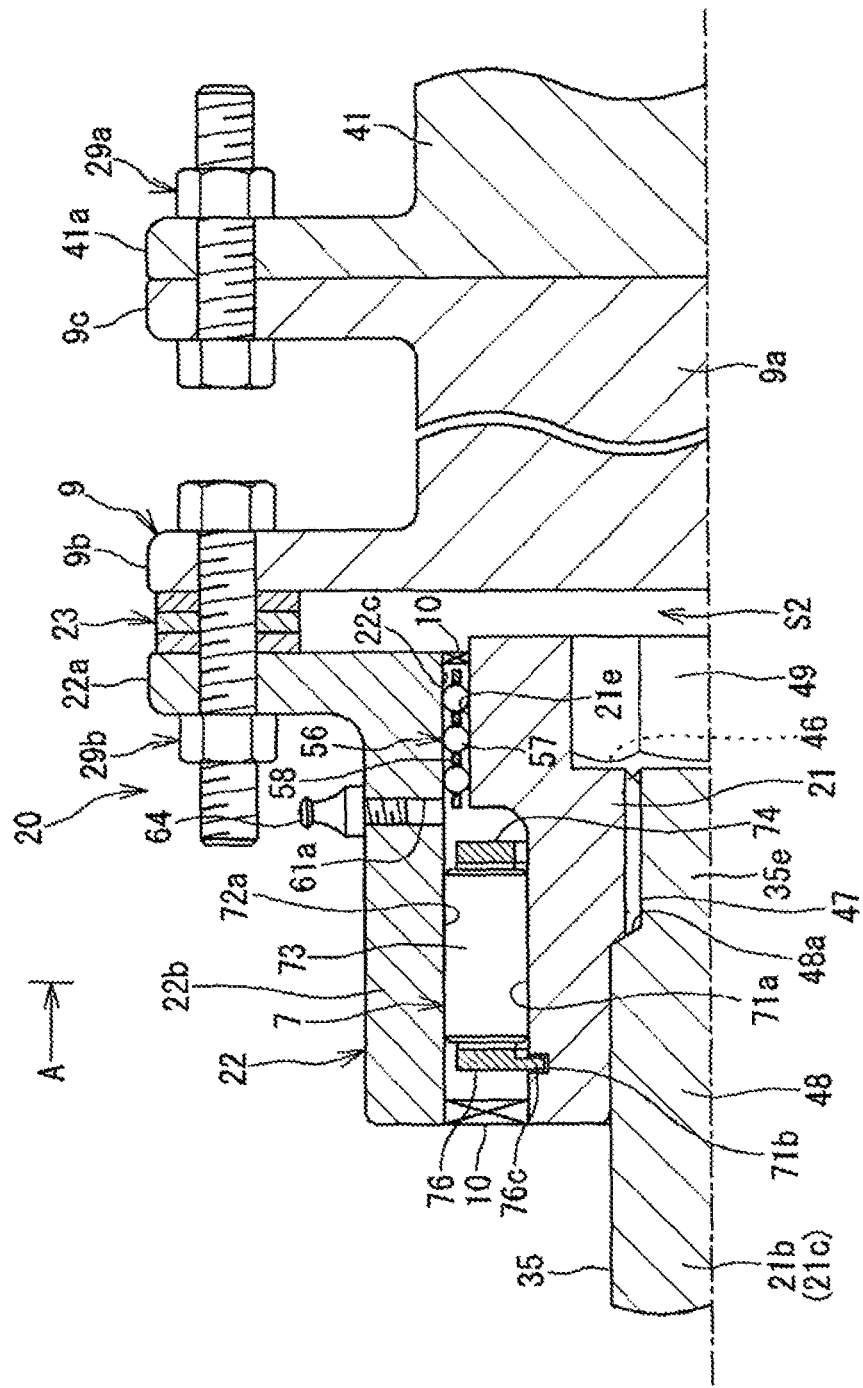
FIG. 12 is a longitudinal cross-sectional view showing a shaft joint, a clutch unit and surroundings thereof.

FIG. 12 is a longitudinal cross-sectional view showing the shaft joint 9, the clutch unit 20 and surroundings thereof. The clutch unit 20 shown in FIG. 12 has, like the clutch unit 20 shown in FIG. 4, the shaft coupling portion 21 coupled to the output shaft 35, the joint coupling portion 22 coupled to the shaft joint 9 and the one-way clutch 7 provided between the shaft coupling portion 21 and the joint coupling portion 22. In the embodiments shown in FIG. 4 and FIG. 12, the same constituent elements are denoted by the same reference numerals and signs.

Comparing the clutch unit 20 shown in FIG. 4 and the clutch unit 20 shown in FIG. 12, the coupling structure of the output shaft 35 and the shaft coupling portion 21 and the support structure of the shaft coupling portion 21 and the joint coupling portion 22 are different. Moreover, the embodiment shown in FIG. 12 is different from the embodiment shown in FIG. 4 in that the inner ring of the one-way clutch 7 is formed of part of the shaft coupling portion 21.

The above-mentioned coupling structure will be described. On an end portion 35e of the output shaft 35, a male screw 46 is formed. On the contrary, the shaft coupling portion 21 is formed of a hollow shaft member, and a female screw 47 screwed with the male screw 46 is formed on the shaft coupling portion 21. The female screw 47 has a structure in which when its tightening with the male screw 46 is completed, rotation is locked in the tightening direction. That is, the output shaft 35 has a large-diameter portion 48 with a radial dimension larger than that of the male screw 46, and when the female screw 47 and the male screw 46 are tightened together, finally, the end surface of the female screw 47 in the axial direction abuts on an end surface 48a of the large-diameter portion 48 in the axial direction. Thereby, the output shaft 35 and the shaft coupling portion 21 cannot be relatively rotated any more, so that rotation is locked in the tightening direction.

While the shaft coupling portion 21 is rotated with respect to the output shaft 35 so that the screws 46 and 47 are screwed to be coupled together, to perform the work easily, a hexagonal hole 49 is formed on the shaft coupling portion 21. That is, part of a hexagonal wrench is inserted in the hexagonal hole 49 to perform tightening.

The direction of tightening of the screws 46 and 47 is set to the same direction as the rotation direction of the output shaft 35 and the input shaft 41 at the time of power generation by the power generator 4. Thereby, even if the running torque acts between the output shaft 35 and the shaft coupling portion 21 because of power generation, the screws 46 and 47 are never unscrewed.

According to the above coupling structure, the output shaft 35 and the shaft coupling portion 21 can be easily coupled.

The above-mentioned support structure will be described. The joint coupling portion 22 is formed of a tubular member, and the shaft coupling portion 21 is formed of a shaft-shaped (hollow shaft-shaped) member situated radially inside the tubular member. The clutch unit 20 has a support portion 56 for concentrically supporting the shaft coupling portion 21 and the joint coupling portion 22.

The support portion 56 has a plurality of ball rows (three ball rows in FIG. 12), and each ball row has a ball 57 arranged more then one in number in the circumferential direction. Further, the support portion 56 has a ring-shaped cage 58, and the cage 58 is capable of holding the ball rows at intervals in the axial direction and of holding the balls 57 included in the ball rows at intervals in the circumferential direction.

In the area where the support portion 56 is provided, an inner peripheral surface 22c of the joint coupling portion 22 and an outer peripheral surface 21e of the shaft coupling portion 21 are each formed of a cylindrical surface. This support portion 56 is rotatable in the circumferential direction, and is also movable in the axial direction.

From the above, the support portion 56 has the balls 57 interposed between the outer peripheral surface 21e of the shaft coupling portion 21 and the inner peripheral surface 22c of the joint coupling portion 22 and the cage 58 holding the balls 57 at intervals in the circumferential direction, and is capable of supporting the shaft coupling portion 21 and the joint coupling portion 22 in such a manner that they are relatively movable in the axial direction and relatively rotatable.

According to this support structure, since the shaft coupling portion 21 and the joint coupling portion 22 are relatively movable in the axial direction, even if the axial length is changed by thermal expansion and contraction due to a temperature rise or a temperature fall in the part from the output shaft 35 by way of the shaft joint 9 to the input shaft 41, the change can be absorbed by the structure of the shaft coupling portion 21 and the joint coupling portion 22, and the support portion 56.

Although not shown, a structure may be adopted in which the shaft coupling portion 21 is a tubular member, the joint coupling portion 22 is a shaft-shaped member situated radially inside this tubular member and the support portion 56 is provided therebetween.

[Regarding Another Embodiment of the Clutch Unit 20]

Figure 16:
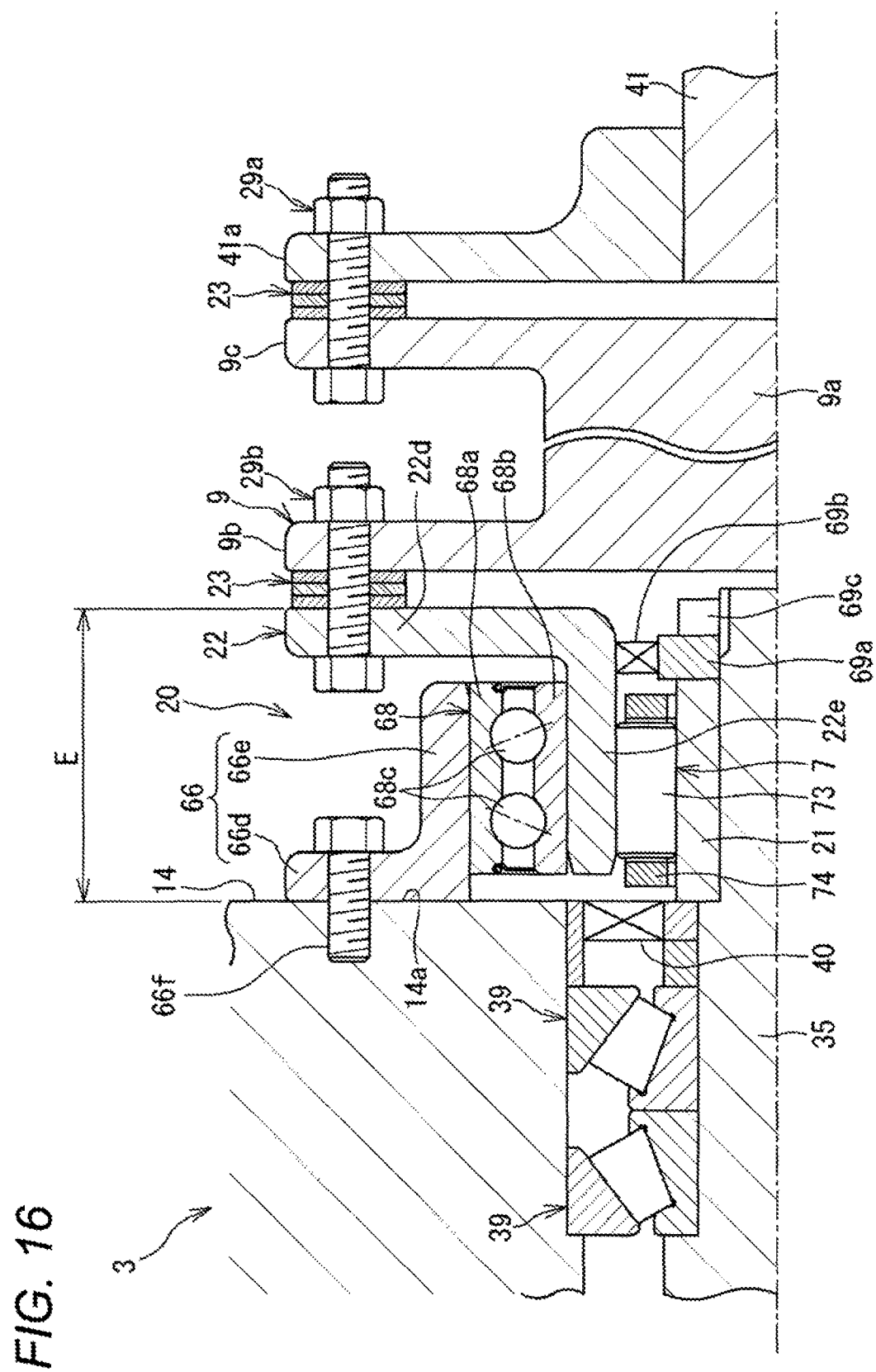
FIG. 16 is a longitudinal cross-sectional view showing a shaft joint, a clutch unit and surroundings thereof.

FIG. 16 is a longitudinal cross-sectional view showing the shaft joint 9, the clutch unit 20 and surroundings thereof. The clutch unit 20 shown in FIG. 16 is interposed between the shaft joint 9 and the output shaft 35 of the speed increaser 3 like the embodiments shown in FIG. 4 and FIG. 12. Moreover, like the clutch unit 20 shown in FIG. 4 and FIG. 12, the clutch unit 20 of the present embodiment also has the shaft coupling portion 21 coupled to the output shaft 35 and rotating integrally with the output shaft 35, the joint coupling portion 22 coupled to the shaft joint 9 and rotating integrally with the shaft joint 9 and the one-way clutch 7 provided between the shaft coupling portion 21 and the joint coupling portion 22. In the embodiments shown in FIG. 4 (FIG. 12) and FIG. 16, the same constituent elements are denoted by the same reference numerals and signs as much as possible.

Comparing the clutch unit 20 shown in FIG. 4 (FIG. 12) and the clutch unit 20 shown in FIG. 16, in addition to the coupling structure of the output shaft 35 and the shaft coupling portion 21, the support structure of the joint coupling portion 22 and the shaft coupling portion 21 is different. The clutch unit 20 shown in FIG. 16 is further provided with a support member 66 for supporting the joint coupling portion 22, the shaft coupling portion 21 and the like. Hereinafter, the structure of the clutch unit 20 shown in FIG. 16 will be described.

This clutch unit 20 further has the support member 66 fixed to the housing 14 of the speed increaser 3 and a rolling bearing 68 provided between the support member 66 and the joint coupling portion 22.

The speed increaser 3 is provided with the housing 14, the output shaft 35, the roller bearings 39 and a sealing member 40. The housing 14 is set in a state of being placed on the floor (concrete floor) of the nacelle 13 (see FIG. 1), and the self weight of the speed increaser 3 including the housing 14 is supported by this floor. A plurality of rows of roller bearings 39 are provided on the inner peripheral surface of the housing 14, and the output shaft 35 is rotatably supported by the housing 14 by these roller bearings 39. In the ring-shaped space formed between the housing 14 and the output shaft 35, in addition to the roller bearings 39, the sealing member 40 is provided on the open end side, thereby preventing foreign matter from entering the speed increaser 3. The output shaft 35 protrudes outward in the axial direction from an end surface 14a of the housing 14.

The shaft coupling portion 21 is a tubular member, and is externally fitted on the output shaft 35 and fixed. For this reason, the shaft coupling portion 21 is rotatable integrally with the output shaft 35. A ring-shaped spacer 69a is provided axially next to the shaft coupling portion 21, and a sealing member 69b is provided between the spacer 69a and the joint coupling portion 22. The sealing member 69b prevents foreign matter from entering the side of the one-way clutch 7. Moreover, a nut member 69c is screwed with the bolt portion formed on the end portion of the output shaft 35. By this nut member 69c, the shaft coupling portion 21 and the spacer 69a are prevented from moving in the axial direction and dropping from the output shaft 35.

The joint coupling portion 22 is annular as a whole, has a rotational flange portion 22d coupled to the shaft joint 9 and a rotational cylindrical portion 22e integral with the rotational flange portion 22d and having a cylindrical shape, and is L-shaped in cross section. The rotational flange portion 22d is coupled to the flange portion 9b of the shaft joint 9 through the spacer (flexible member) 23 by the bolt/nut 29b. The rotational cylindrical portion 22e is continuous with the rotational flange portion 22d and rotates integrally with the rotational flange portion 22d. The one-way clutch 7 is provided on the inner periphery side of the rotational cylindrical portion 22e.

The one-way clutch 7 has a similar structure to that of the above-described embodiments (see FIG. 5), and makes the rotation of the output shaft 35 transmittable to the input shaft 41 of the power generator 4 through the shaft coupling portion 21, the joint coupling portion 22 and the shaft joint 9. The one-way clutch 7 is provided with an inner ring portion, an outer ring portion and a plurality of rollers (engagement elements) 73. In the present embodiment, the inner ring portion is formed of the shaft coupling portion 21, and the outer ring portion is formed of the rotational cylindrical portion 22e of the joint coupling portion 22. That is, the shaft coupling portion 21 functions as the inner ring of the one-way clutch 7, and the rotational cylindrical portion 22e functions as the outer ring of the one-way clutch 7. The inner ring portion and the outer ring portion may be members separate from the shaft coupling portion 21 and the rotational cylindrical portion 22e, respectively.

The roller 73 of the one-way clutch 7 is disposed more than one in number between the outer peripheral surface of the shaft coupling portion (inner ring) 21 and the inner peripheral surface of the rotational cylindrical portion (outer ring) 22. In the present embodiment, the rollers 73 are formed in a cylindrical shape, and provided eight in number in the circumferential direction (see FIG. 5).

Moreover, the one-way clutch 7 is further provided with the ring-shaped cage 74 holding the rollers 73 at predetermined intervals in the circumferential direction and a plurality of elastic members (pushing members) 75 elastically pushing the rollers 73 in one direction in the circumferential direction (see FIG. 5).

This one-way clutch 7 has the same function as that of the above-described embodiments. That is, the one-way clutch 7 integrally rotatably connects the shaft coupling portion 21 and the joint coupling portion 22 in a state in which the rotation speed of the output shaft 35 is higher than the rotation speed of the input shaft 41, and disconnects the shaft coupling portion 21 and the joint coupling portion 22 in a state in which the rotation speed of the output shaft 35 is lower than the rotation speed of the input shaft 41.

The support member 66 is annular as a whole, has a fixed flange portion 66d coupled to the housing 14 and a fixed cylindrical portion 66e integral with the fixed flange portion 66d and having a cylindrical shape, and is L-shaped in cross section.

The rolling bearing 68 is provided between the inner peripheral surface of the fixed cylindrical portion 66e and the outer peripheral surface of the rotational cylindrical portion 22e. This enables the rolling bearing 68 to support the joint coupling portion 22 rotatably with respect to the support member 66.

The fixed flange portion 66d of the support member 66 is fixed to the end surface 14a of the side portion of the housing 14 by a bolt 66f. The fixed cylindrical portion 66e is situated radially outside the rotational cylindrical portion 22e of the joint coupling portion 22. The rolling bearing 68 is interposed between the fixed cylindrical portion 66e and the rotational cylindrical portion 22e, and the fixed cylindrical portion 66e and the rotational cylindrical portion 22e can be situated concentrically. Since the support member 66 is fixed to the housing 14, the joint coupling portion 22 provided through the rolling bearing 68 is radially positioned with respect to the support member 66. For this reason, even if the engagement with the joint coupling portion 22 and the shaft coupling portion 21 by the rollers 73 is released in the one-way clutch 7, the joint coupling portion 22 and the shaft joint 9 coupled thereto can maintain concentricity with the output shaft 35.

According to the clutch unit 20 of the above-described present embodiment, the joint coupling portion 22 can be rotatably attached to the housing 14 of the speed increaser 3 through the support member 66 and the rolling bearing 68. For this reason, the load due to the gravity (weight) of the shaft joint 9 acting through the joint coupling portion 22, the gravity (weight) of the one-way clutch 7 provided between the joint coupling portion 22 and the shaft coupling portion 21 and the gravity (weight) of the joint coupling portion 22 itself is transmitted to the housing 14 and the housing 14 can support this load. That is, the rolling bearing 68 is a rolling bearing for support and fixing (for the housing 14).

If the support member 66 is not provided, the stress and the mechanical load on the shaft joint 9 and the clutch unit 20 increase because of the weights of the shaft joint 9 and the clutch unit 20. For example, if a deformation occurs or a misalignment occurs on the output shaft 35 and the input shaft 41 because of these weights, there is a possibility that the above-described engagement by the one-way clutch 7 and the release thereof cannot be performed smoothly, and there are cases where the function as the one-way clutch deteriorates. On the contrary, according to the clutch unit 20 of the present embodiment, the occurrence of a deformation and a misalignment can be suppressed by the support member 66.

Moreover, in the present embodiment, the joint coupling portion 22 has the rotational cylindrical portion 22e where the one-way clutch 7 is provided on the inner periphery side, and the support member 66 has the fixed cylindrical portion 66e concentric with the rotational cylindrical portion 22e and situated radially outside the rotational cylindrical portion 22e. The rolling bearing 68 is provided between the fixed cylindrical portion 66e and the rotational cylindrical portion 22e. The rollers 73 of the one-way clutch 7 are situated in the area of the rolling bearing 68 in the axial direction. This results in a structure in which the one-way clutch 7 is provided on the inner periphery side of the rotational cylindrical portion 22e of the joint coupling portion 22 and the rolling bearing 68 is provided on the outer periphery side of the rotational cylindrical portion 22e.

The above results in an arrangement where the one-way clutch 7 and the rolling bearing 68 are aligned in the radial direction, so that the axial dimension E of the joint structure (the clutch unit 20) can be reduced. That is, the axial distance between the shaft joint 9 and the speed increaser 3 can be made shorter than that of the above-described embodiments. The positions of the rolling bearing 68 and the one-way clutch 7 in the axial direction may be changed.

The rolling bearing 68 is a double row rolling bearing where rolling elements are provided in two rows in the axial direction. Alternatively, it may be a four-point contact ball bearing. Since this enables the support member 66 in a state of being fixed to support the joint coupling portion 22 by two rows of balls (rolling elements) 68c provided so as to be separated in the axial direction, the occurrence of an inclination of the center line of the support member 66 and the joint coupling portion 22 can be suppressed. As a consequence, the occurrence of an inclination of the clutch unit 20 and the like by the moment acting on the joint coupling portion 22 can be suppressed for the support member 66 in a state of being fixed. The rolling elements of the rolling bearing 68 may be other than balls and may be rollers.

Figure 17:
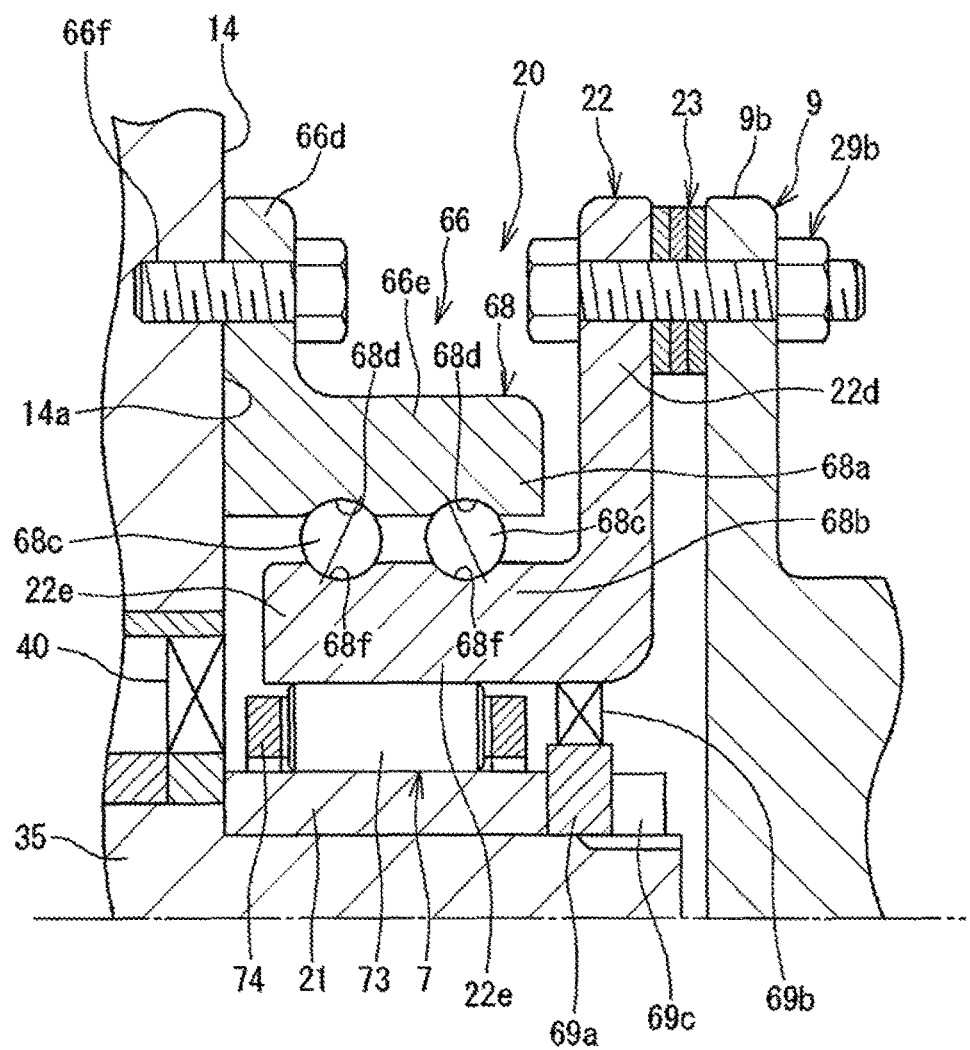
FIG. 17 is a longitudinal cross-sectional view showing a modification of the clutch unit shown in FIG. 16.

While an outer ring 68a of the rolling bearing 68 is separate from the support member 66 in the embodiment shown in FIG. 16, the fixed cylindrical portion 66e of the support member 66 may serve also as the outer ring of the rolling bearing 68 as in the modification shown in FIG. 17. In this case, the raceways (raceway grooves) 68d of the balls (rolling elements) 68c of the rolling bearing 68 are provided on the inner peripheral surface of the fixed cylindrical portion 66e.

Moreover, while an inner ring 68b of the rolling bearing 68 is separate from the joint coupling portion 22 in the embodiment shown in FIG. 16, the rotational cylindrical portion 22e of the joint coupling portion 22 may serve also as the inner ring of the rolling bearing 68 as shown in FIG. 17. In this case, the raceway (raceway grooves) 68f of the balls (rolling elements) 68c of the rolling bearing 68 are provided on the outer peripheral surface of the rotational cylindrical portion 22e.

By the fixed cylindrical portion 66e serving also as the outer ring of the rolling bearing 68 and the rotational cylindrical portion 22e serving also as the inner ring of the rolling bearing 68 as described above, the number of parts can be reduced, and the reduction in the number of parts facilitates assembly.

In the embodiment shown in FIG. 16 (FIG. 17), the fixed object to which the support member 66 is to be fixed is the housing 14 of the speed increaser 3, and the clutch unit 20 is interposed between the shaft joint 9 and the output shaft 35 of the speed increaser 3. The housing 14 is placed on the floor of the nacelle 13 where the wind power generation device 1 is provided, and is supported by this floor. Thereby, the load due to the gravities (weights) of the constituent members of the clutch unit 20 and the like is transmitted to the housing 14 of the speed increaser 3 and the housing 14 of the speed increaser 3 can support this load.

While a case where the support member 66 is fixed to the housing 14 of the speed increaser 3 as the fixed object of the wind power generation device 1 is described in the embodiment shown in FIG. 16 (FIG. 17), additionally, the fixed object may be, although not shown, for example, a slab or a pole in the nacelle 13.

Figure 18:
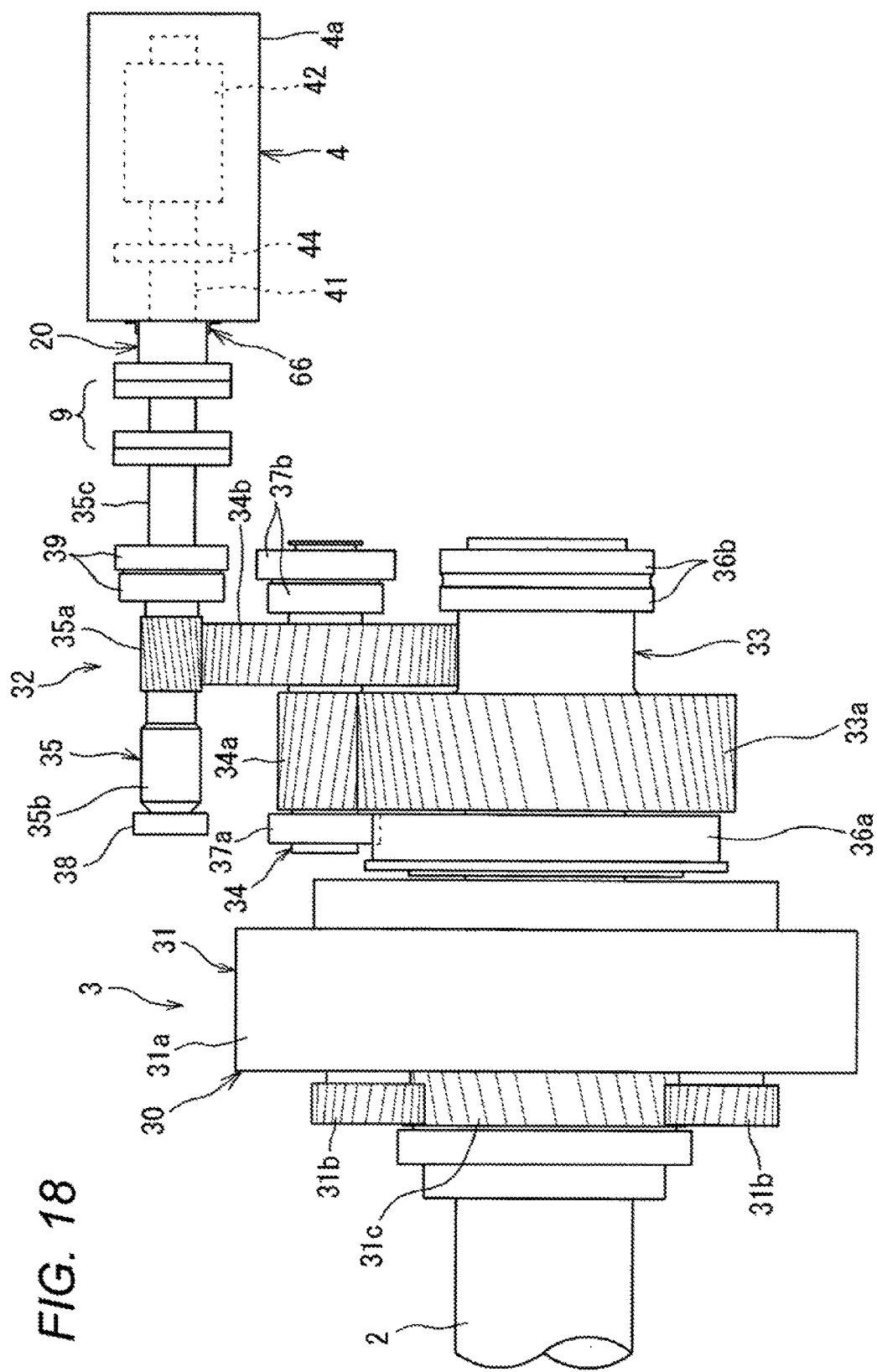
FIG. 18 is a schematic side view showing a modification of the wind power generation device.

While a case where the clutch unit 20 is provided between the output shaft 35 of the speed increaser 3 and the shaft joint 9 is described in the embodiment shown in FIG. 16 (FIG. 17) as described above, as another embodiment, the clutch unit 20 may be provided between the shaft joint 9 and the input shaft 41 of the power generator 4 as shown in FIG. 18. In this case, the fixed object to which the support member 66 is to be fixed is a housing 4a of the power generator 4, and the clutch unit 20 is interposed between the shaft joint 9 and the input shaft 41 of the power generator 4. The support member 66 of the clutch unit 20 is fixed to the housing 4a of the power generator 4. The housing 4a is placed on the floor of the nacelle 13 (see FIG. 1) where the wind power generation device 1 is provided, and is supported by this floor. Thereby, the load due to the gravities (weights) of the constituent members of the clutch unit 20 and the like is transmitted to the housing 4a of the power generator 4 and the housing 4a can support this load.

FIGS. 19(A) to 19(D) and FIGS. 20(A) to (D) are explanatory views explaining an assembly method of the clutch unit 20 shown in FIG. 16. As shown in FIGS. 19(A) and (B), a plurality of rollers (engagement elements) 73 for the one-way clutch 7 and the ring-shaped cage 74 are provided on the outer periphery side of the shaft coupling portion 21 which is cylindrical. This shaft coupling portion 21 is in a state before it is attached to the output shaft 35. The joint coupling portion 22 is brought near the shaft coupling portion 21 from the axial direction, and the joint coupling portion 22 is attached to the outside of the roller 73 in the radial direction (see FIGS. 19(C) and (D)). In this case, the ring-shaped sealing member 69b is attached on the inner periphery side of the rotational cylindrical portion 22e of the joint coupling portion 22. Moreover, the ring-shaped spacer 69a is provided in a position on the inner periphery side of the sealing member 69b and axially adjoining the shaft coupling portion 21. An intermediate product assembled in this way is called a first intermediate product M1.

Moreover, to facilitate the attachment when the joint coupling portion 22 is brought near the shaft coupling portion 21 from the axial direction and the joint coupling portion 22 is attached to the outside of the rollers 73 in the radial direction as shown in FIG. 19(C), a tapered portion is provided on an end portion of the inner peripheral surface of the rotational cylindrical portion 22e of the joint coupling portion 22. This tapered portion is formed of a tapered surface the diameter of which expands outward in the axial direction.

Figure 20A:
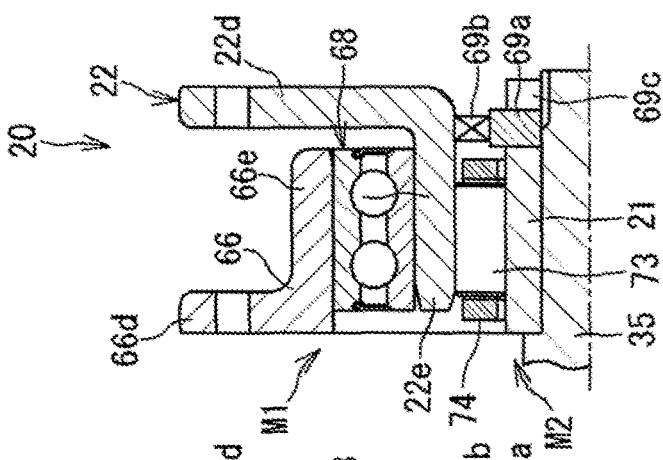
FIGS. 20(A) to 20(D) are explanatory views explaining the assembly method of the clutch unit.
Figure 20B:
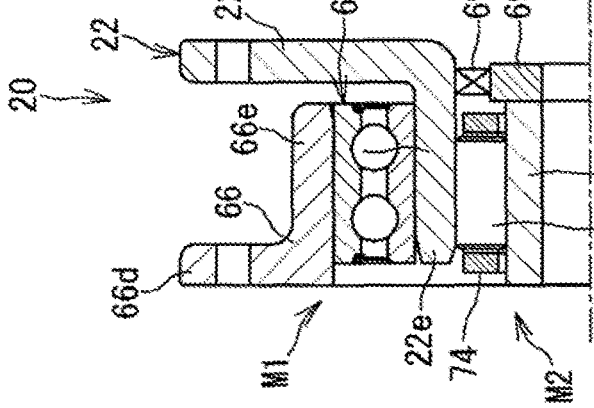

Apart from the first intermediate product M1, as shown in FIGS. 20(A) and (B), the rolling bearing 68 is attached to the inner periphery side of the support member 66, and this is called a second intermediate product.

Figure 20C:
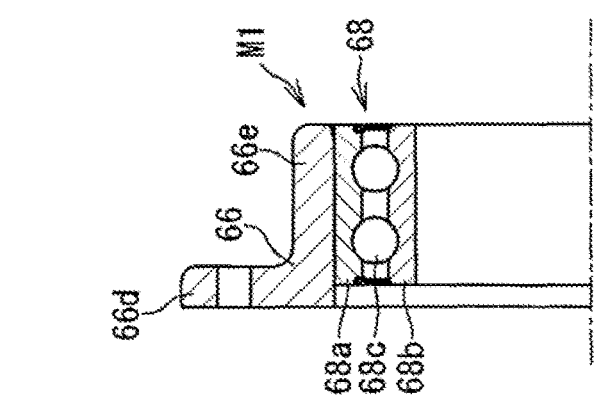

Then, as shown in FIG. 20(C), the first intermediate product M1 and the second intermediate product M2 are brought near each other in the axial direction and combined together, thereby obtaining the clutch unit 20. To facilitate the combination (attachment) when the intermediate products M1 and M2 are brought near each other in the axial direction and combined together as described above, a tapered portion is provided on an end portion of the outer peripheral surface of the rotational cylindrical portion 22e of the joint coupling portion 22. This tapered portion is formed of a tapered surface the diameter of which contracts outward in the axial direction.

Figure 20D:
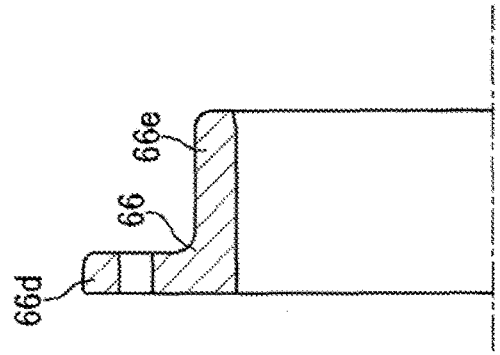
Figure 21:
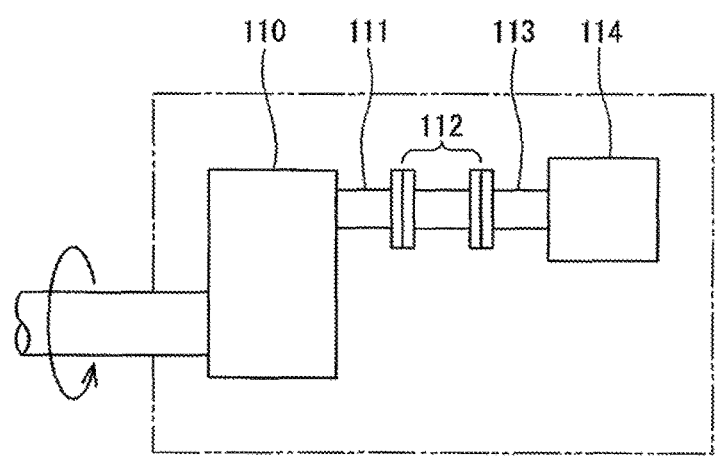
FIG. 21 is an explanatory view explaining the schematic structure of the wind power generation device of the background art.

Then, this clutch unit 20 and the output shaft 35 are brought near each other in the axial direction and coupled together, that is, the shaft coupling portion 21 and the spacer 69a are externally fitted on the output shaft 35, the nut member 69c is screwed with the bolt portion formed at the end of the output shaft 35 and is tightened (see FIG. 20(D)). Then, the support member 66 of the clutch unit 20 is fixed to the non-illustrated housing 14 of the speed increaser 3, and to this clutch unit 20, the non-illustrated shaft joint 9 is attached.

The above results in a structure in which the clutch unit 20 shown in FIG. 16 is provided between the speed increaser 3 and the shaft joint 9.

[Regarding Still Another Embodiment of the Clutch Unit 20]

Figure 13:
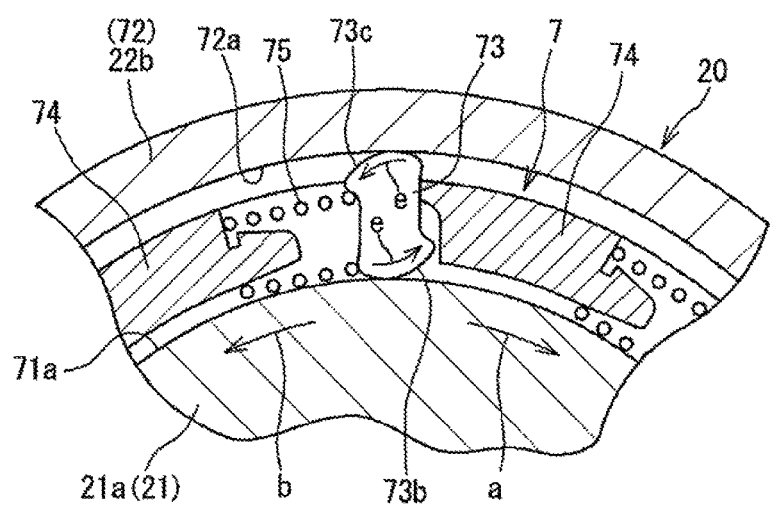
FIG. 13 is a transverse cross-sectional view showing part of the clutch unit.

FIG. 13 is a transverse cross-sectional view showing part of the clutch unit 20. The one-way clutch 7 of this clutch unit 20 uses a sprag 73 as the engagement element. In this case, the cam surface as shown in FIG. 7 is not formed on the outer peripheral surface 71a of the inner ring 71, and the outer peripheral surface 71a is formed as a cylindrical surface. In the embodiment shown in FIG. 13, the inner ring portion of the one-way clutch 7 is formed of part of the shaft main portion 21a, and is not provided with the separate inner ring 71 as in the case of FIG. 4. This one-way clutch 7 is applicable to the above-described embodiments.

The sprag 73 is provided with a first abutment surface 73b abutting on the outer peripheral surface 71a of the shaft main portion 21a and a second abutment surface 73c abutting on the inner peripheral surface 72a of the cylindrical main portion 22b, and the first abutment surface 73b and the second abutment surface 73c are each formed in a convex and substantially arc shape. Moreover, the distance between the abutment point of the first abutment surface 73b abutting on the outer peripheral surface 71a of the shaft main portion 21a and the abutment point of the second abutment surface 73c abutting on the inner peripheral surface 72a of the cylindrical main portion 22b (hereinafter, referred to as inter-abutment-point distance) changes according to the inclination of the sprag 73. That is, when the shaft main portion 21a rotates in the direction of the arrow a with respect to the cylindrical main portion 22b, the sprag 73 inclines in the direction of the arrow e, so that the inter-abutment-point distance increases. On the contrary, when the shaft main portion 21a rotates in the direction of the arrow b with respect to the cylindrical main portion 22b, the sprag 73 inclines in the direction opposite to the arrow e, so that the inter-abutment-point distance decreases.

When the inter-abutment-point distance increases, the sprag 73 engages the outer peripheral surface 71a of the shaft main portion 21a and the inner peripheral surface 72a of the cylindrical main portion 22b, and conversely, when the inter-abutment-point distance decreases, the engagement between the sprag 73, and the outer peripheral surface 71a of the shaft main portion 21a and the inner peripheral surface 72a of the cylindrical main portion 22b is released.

Thus, when the shaft main portion 21a behaves so as to relatively rotate in the direction of the arrow a with respect to the cylindrical main portion 22b, the shaft main portion 21a and the cylindrical main portion 22b are integrally rotatably connected, and when the shaft main portion 21a relatively rotates in the direction of the arrow b with respect to the cylindrical main portion 22b, the shaft main portion 21a and the cylindrical main portion 22b are disconnected. Thereby, regarding the relationship between the output shaft 35 and the input shaft 41, switching between the integrally rotating state and the relatively rotating state can be made as in the above-described embodiments.

In the case of the embodiment shown in FIG. 13, in addition to the advantages similar to those of the above-described embodiments, it is unnecessary to form the cam surface on the shaft main portion 21a, so that the manufacturing cost can be reduced. Moreover, since the shaft main portion 21a can be used as the inner ring, the manufacturing cost can be further reduced, and the structure of the one-way clutch 7 can be simplified and the radial dimension thereof can be reduced. Moreover, since the sprag 73 is easily made high in rigidity and the torque capacity is easily increased compared with the rollers, the radial and axial dimensions of the sprag 73 itself can be reduced. Consequently, size reduction can be achieved by reducing the radial and axial dimensions of the one-way clutch 7. By thus reducing the size of the one-way clutch 7, the overall size of the clutch unit 20 can be reduced in the radial direction and in the axial direction.

[Wind Power Generation Device 1 Provided with the Clutch Unit 20 of the Embodiments]

As described above, the wind power generation device 1 (see FIG. 1) is provided with a joint structure provided with the main shaft 2 that rotates by wind power, the speed increaser 3 that increases the rotation speed of the main shaft 2 and outputs it from the output shaft 35, the power generator 4 that has the input shaft 41 rotating by receiving the rotation of the output shaft 35 and generates power as the rotor rotating integrally with the input shaft 41 rotates, the shaft joint 9 that is provided between the output shaft 35 and the input shaft 41 to make it possible to transmit the torque between the output shaft 35 and the input shaft 41, and the clutch unit 20 according to the above-described embodiments interposed between the shaft joint 9 and the output shaft 35.

The clutch unit 20 has the one-way clutch 7, for example, as shown in FIG. 4, and as described above, this one-way clutch 7 is capable of integrally rotatably connecting the shaft coupling portion 21 and the joint coupling portion 22 in a state in which the rotation speed of the output shaft 35 is higher than the rotation speed of the input shaft 41 and disconnecting the shaft coupling portion 21 and the joint coupling portion 22 in a state in which the rotation speed of the output shaft 35 is lower than the rotation speed of the input shaft 41.

As a consequence, in a state in which the output shaft 35 of the speed increaser 3 rotates with increasing speed by the power inputted from the side of the main shaft 2 rotating by receiving the wind power so that the rotation speed of the output shaft 35 is about to exceed the rotation speed of the input shaft 41, the output shaft 35 rotating integrally with the shaft coupling portion 21 is connected to the input shaft 41 through the shaft joint 9 rotating integrally with the joint coupling portion 22, and rotates integrally. Consequently, the power inputted from the side of the main shaft 2 is transmitted to the input shaft 41 and power generation is performed by the power generator 4.

Then, for example, when the wind power is decreased from this power generating state and the rotation of the output shaft 35 with increasing speed is stopped, although the output shaft 35 decelerates, the input shaft 41 behaves so as to continue rotating by the inertial force of the rotor 42. In this case, the rotation speed of the shaft coupling portion 21 integrally rotating together with the output shaft 35 becomes lower than the rotation speed of the joint coupling portion 22 integrally rotating together with the input shaft 41, and the shaft coupling portion 21 of the output shaft 35 and the joint coupling portion 22 on the side of the input shaft 41 are disconnected by the one-way clutch 7.

That is, even if the rotation speed of the output shaft 35 is drastically decreased through the main shaft 2 because of reduction in wind power, the rotation by the inertia of the rotor 42 of the power generator 4 can be prevented from being transmitted to the output shaft 35 through the input shaft 41.

Therefore, even if the output shaft 35 decelerates, since the output shaft 35 and other shafts provided on the speed increaser 3 side of the output shaft 35 rotate inertially, drastic torque release is prevented, so that the rotation delay of the rolling elements (the cylindrical rollers 38c) of the rolling bearings (for example, the roller bearings 38 in FIG. 3) supporting the output shaft 35 and the other shafts can be suppressed.

For this reason, when the wind power increases to resume the rotation of the output shaft 35 with increasing speed after the output shaft 35 decelerates, the rotation speed of the output shaft 35 exceeds the rotation speed of the input shaft 41, the output shaft 35 and the input shaft 41 are again connected by the one-way clutch 7 and a radial load acts on the rolling bearings (the roller bearings 38); however, since the rotation delay of the rolling elements (the cylindrical rollers 38c) of the rolling bearings (the roller bearings 38) is suppressed, decrease in the life of the rolling bearings (the roller bearings 38) due to the occurrence of the smearing on the rolling elements (the cylindrical rollers 38c) and the raceway surface where these rolling elements roll can be suppressed.

Moreover, when the rotation speed of the output shaft 35 drastically decreases through the main shaft 2 because of reduction in wind power, since the rotor 42 of the power generator 4 does not drastically decelerate but continues rotating due to inertia by the shaft coupling portion 21 and the joint coupling portion 22 being disconnected, the average rotation speed of the rotor 42 can be increased. Thereby, the power generation efficiency of the power generator 4 can be improved.

Moreover, according to the rolling bearing 8 shown in FIG. 4, the support portion 56 shown in FIG. 12 and the support member 66 and the rolling bearing 68 shown in FIG. 16, even if the shaft coupling portion 21 of the output shaft 35 and the joint coupling portion 22 on the side of the input shaft 41 are disconnected by the one-way clutch 7, that is, even if the engagement of the rollers 73 as the engagement elements of the one-way clutch 7 is released, the shaft coupling portion 21 and the joint coupling portion 22 can be concentrically supported, so that radial shakes (wobbles) of the shaft coupling portion 21 and the joint coupling portion 22 can be prevented.

Further, in the above-described embodiments, the one-way clutch 7 is provided not in the area of the shaft joint 9 in the axial direction but as one constituent element of the clutch unit 20 between the shaft joint 9 and the speed increaser 3. For this reason, a joint structure is obtained in which even if there is no space enough to provide the one-way clutch 7 in the area of the shaft joint 9, the occurrence of the smearing as described above can be suppressed.

Moreover, since the shaft coupling portion 21 is formed of a member separate from the output shaft 35 and coupled to the output shaft 35 and the joint coupling portion 22 is formed of a member separate from the shaft joint 9 and coupled to the shaft joint 9, the joint structure can be incorporated in the existing wind power generation device 1 provided with the speed increaser 3 and the power generator 4 while the existing shaft joint 9 is retained as it is. However, the output shaft 35 needs to be changed or processed. That is, as the output shaft 35, it is necessary to adopt one where the hole 35d is formed as shown in FIG. 4 or to adopt one where the male screw 46 is formed as shown in FIG. 12.

Moreover, particularly in the case of the embodiment shown in FIG. 12, when the inner peripheral surface 72a of the outer ring 72 of the one-way clutch 7 is moved in the axial direction with respect to the rollers 73 by the relative movements of the shaft coupling portion 21 and the joint coupling portion 22 in the axial direction, the position of the substantial inner peripheral surface 72a is shifted in the axial direction. In particular, since the wind power generation device 1 is large in size, the position shift amount is inevitably large. To cope with such a position shift, it is preferable to previously perform, on the inner peripheral surface 72a of the cylindrical main portion 22b, a surface treatment necessary for the inner peripheral surface 72a in an area including the estimated position shift amount. This position shift amount can be estimated by assuming a temperature change range (for example, $-40°$ to $60°$) from the environmental temperature where the wind power generation device 1 is used, the temperature in the nacelle considering the heat generation amount of the power generator 4, and the like and obtaining the expansion/contraction amount of each member in this temperature range by a calculation or an experiment.

The surface treatment on the inner peripheral surface 72a may be, for example, a surface modification treatment such as a carbonitriding treatment or a coating treatment such as a blackening treatment or a DLC coating. Moreover, it may be a heat treatment such as quenching or tempering.

Moreover, according to the space (clearance) S2 shown in FIG. 12 and the spaces (clearances) S1 and S2 shown in FIG. 4, even if the shafts expand or contract in the axial direction, they can be prevented from interfering with the axially adjoining members. It is preferable that these spaces S1 and S2 be set to dimensions larger than the axial expansion/contraction amounts of the shafts at the upper limit (maximum temperature) of the assumed temperature change range.

Moreover, when the brake 44 that brakes the input shaft 41 is provided as shown in FIG. 2, it is preferable that the one-way clutch 7 (the clutch unit 20 incorporating this) be disposed between the speed increaser 3 and the brake 44. This is because if the one-way clutch 7 is disposed between the brake 44 and the power generator 4, it is difficult to swiftly stop the power generator 4 at times such as when an anomaly of the power generator 4 occurs since only the rotation on the side of the speed increaser 3 is decelerated even if the brake 44 is applied during rotation and the rotation on the side of the power generator 4 is continued by the one-way clutch 7 to cause idling.

The present invention is not limited to the above-described embodiments and may be modified as appropriate when carried out.

Figure 14:
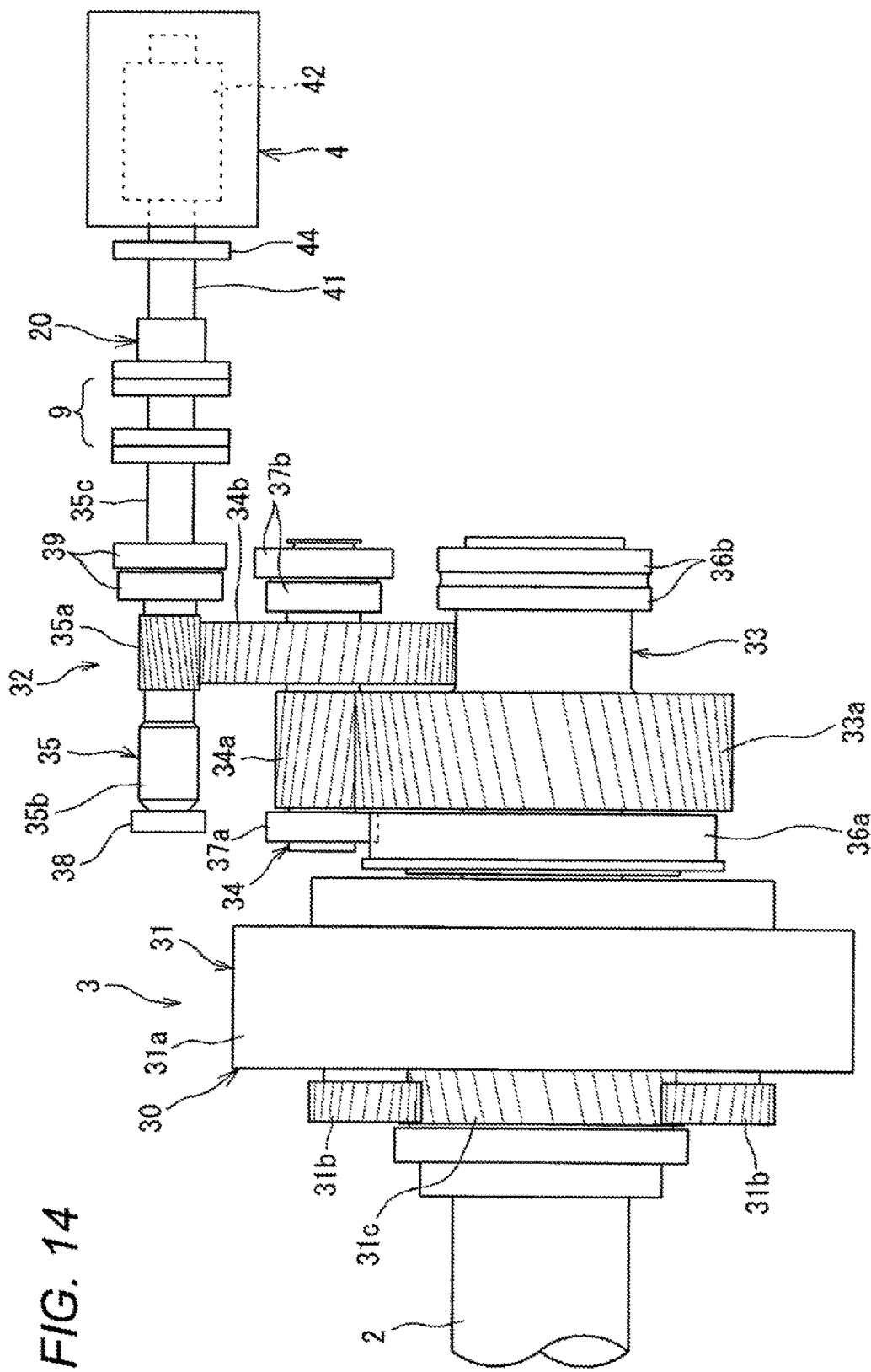
FIG. 14 is a schematic side view showing a speed increaser and a power generator.

For example, while a case where the clutch unit 20 is provided between the output shaft 35 of the speed increaser 3 and the shaft joint 9 is described in the above-described embodiment (see FIG. 2), as another embodiment, the clutch unit 20 may be provided between the shaft joint 9 and the input shaft 41 of the power generator 4 as shown in FIG. 14. Even in this case, the shaft coupling portion 21 is coupled to the input shaft 41 of the power generator 4 although the structure of the clutch unit 20 is the same. That is, it is necessary for the clutch unit 20 only to have the shaft coupling portion 21 coupled to a shaft body formed of the input shaft 41 or the output shaft 35, the joint coupling portion 22 coupled to the shaft joint 9 and the one-way clutch 7 provided between the shaft coupling portion 21 and the joint coupling portion 22.

Moreover, while a structure in which the one-way clutch 7 has the shaft coupling portion 21 and the joint coupling portion 22 facing each other in the radial direction is described in the above-described embodiments, although not shown, a structure in which the shaft coupling portion 21 and the joint coupling portion 22 face each other in the axial direction may be adopted. In this case, the one-way clutch 7 is of the thrust type.

Figure 15:
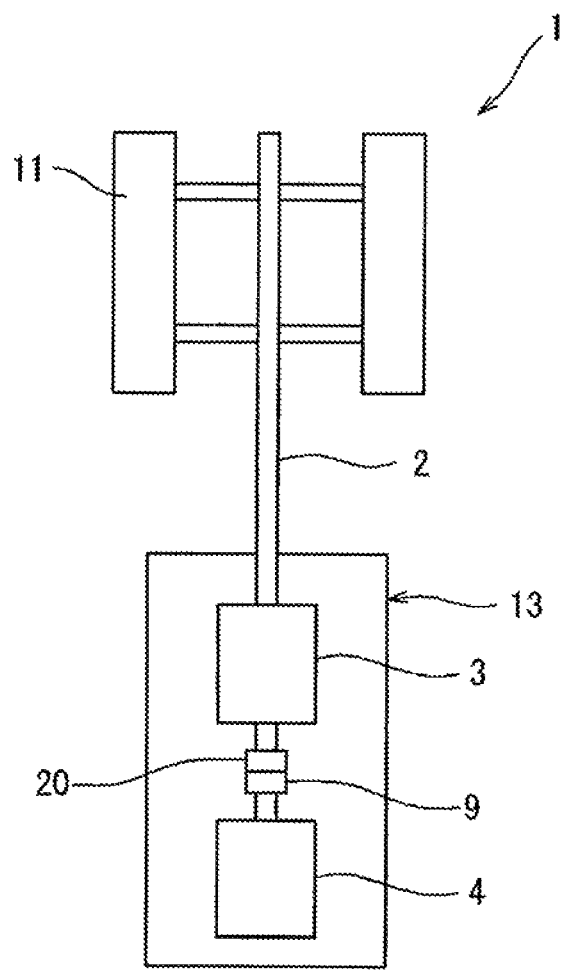
FIG. 15 is a schematic side view showing a modification of the wind power generation device.

Moreover, the wind power generation device is not limited to a horizontal axis type device shown in FIG. 1 but may be a vertical axis type device shown in FIG. 15.

The present application is based upon Japanese Patent Application (Patent Application No. 2013-178228) filed on Aug. 29, 2013 and Japanese Patent Application (Patent Application No. 2013-220888) filed on Oct. 24, 2013, the contents of which are incorporated herein by reference.

DESCRIPTION OF REFERENCE SIGNS

1: Wind power generation device 2: Main shaft 3: Speed increaser 4: Power generator 4a: Housing (fixed object) 7: One-way clutch 8: Rolling bearing 9: Shaft joint 14: Housing (fixed object) 20: Clutch unit 21: Shaft coupling portion 21b: Coupling shaft portion 21c: Insertion shaft portion 22: Joint coupling portion 22d: Rotational flange portion 22e: Rotational cylindrical portion 35: Output shaft 35d: Hole 35e: End portion 41: Input shaft 46: Male screw 47: Female screw 56: Support portion 57: Ball 58: Cage 66: Support member 66d: Fixed flange portion 66e: Fixed cylindrical portion 68: Rolling bearing 68d, 68f: Raceway 73: Roller (engagement element) 73: Sprag (engagement element)

The invention claimed is:

1. A wind power generation device comprising:
a main shaft which rotates by wind power;
a speed increaser which increases a speed of a rotation of the main shaft, and which outputs the rotation from an output shaft;
a power generator which comprises an input shaft which rotates with the rotation of the output shaft as an input, and which generates power by a rotation of a rotor which rotates integrally with a rotation of the input shaft;
a shaft joint which is provided between the output shaft and the input shaft, and which allows a torque to be transmitted between the output shaft and the input shaft; and
a joint structure interposed between the shaft joint and a shaft body which is one of the output shaft and the input shaft, the joint structure including:
    a clutch unit interposed between the shaft joint and a shaft body which is one of the output shaft and the input shaft,
    wherein the clutch unit comprises: a shaft coupling portion which rotates integrally with the shaft body; a joint coupling portion which rotates integrally with the shaft joint; and a one-way clutch provided between the shaft coupling portion and the joint coupling portion,
    wherein the one-way clutch makes a connection integrally rotatably between the shaft coupling portion and the joint coupling portion in a state in which a rotation speed of the output shaft is higher than a rotation speed of the input shaft, and releases the connection between the shaft coupling portion and the joint coupling portion in a state in which the rotation speed of the output shaft is lower than the rotation speed of the input shaft,
    wherein the clutch unit further comprises: a support member fixed to a fixed object of the wind power generation device; and a rolling bearing which is provided between the support member and the joint coupling portion and which supports the joint coupling portion rotatably with respect to the support member,
    wherein the joint coupling portion comprises: a rotational flange portion coupled to the shaft joint; and a rotational cylindrical portion which rotates integrally with the rotational flange portion and in which the one-way clutch is provided on an inner periphery side of the rotational cylindrical portion,
    wherein the support member comprises: a fixed flange portion coupled to the fixed object; and a fixed cylindrical portion which is integral with the fixed flange portion, which is concentric with the rotational cylindrical portion and which is situated radially outside the rotational cylindrical portion,
    wherein the rolling bearing is provided between and contacting an inner peripheral surface of the fixed cylindrical portion and an outer peripheral surface of the rotational cylindrical portion, and
    wherein the generator and the speed increaser are on opposite sides of the one-way clutch in an axial direction of the input shaft and the output shaft.

2. The wind power generation device according to claim 1,
wherein a raceway of a rolling element of the rolling bearing is provided on the inner peripheral surface of the fixed cylindrical portion, and the fixed cylindrical portion also serves as an outer ring of the rolling bearing.

3. The wind power generation device according to claim 1,
wherein a raceway of a rolling element of the rolling bearing is provided on the outer peripheral surface of the rotational cylindrical portion, and the rotational cylindrical portion also serves as an inner ring of the rolling bearing.

4. The wind power generation device according to claim 1, wherein the fixed object is a housing of the speed increaser, and wherein the clutch unit is interposed between the shaft joint and the output shaft.

5. The wind power generation device according to claim 2, wherein a raceway of the rolling element of the rolling bearing is provided on the outer peripheral surface of the rotational cylindrical portion, and the rotational cylindrical portion also serves as an inner ring of the rolling bearing.

6. The wind power generation device according to claim 1, wherein the shaft coupling portion is formed of a member separate from the shaft body and coupled to the shaft body, and wherein the joint coupling portion is formed of a member separate from the shaft joint and coupled to the shaft joint.

\* \* \* \* \*